(12) United States Patent
Backhaus-Ricoult et al.

(10) Patent No.: US 7,964,314 B2
(45) Date of Patent: Jun. 21, 2011

(54) SEGMENTED SOLID OXIDE FUEL CELL STACK AND METHODS FOR OPERATION AND USE THEREOF

(75) Inventors: Monika Backhaus-Ricoult, Horseheads, NY (US); Michael Edward Badding, Campbell, NY (US); James Micheal Harris, Elmira, NY (US); Paul Marx, Corning, NY (US)

(73) Assignee: Corning Incorporated, Corning, NY (US)

( * ) Notice: Subject to any disclaimer, the term of this patent is extended or adjusted under 35 U.S.C. 154(b) by 852 days.

(21) Appl. No.: 11/980,009

(22) Filed: Oct. 30, 2007

(65) Prior Publication Data

US 2009/0110993 A1     Apr. 30, 2009

(51) Int. Cl.
*H01M 8/04* (2006.01)
*H01M 8/12* (2006.01)

(52) U.S. Cl. ........................ 429/428; 429/430

(58) Field of Classification Search .......... 429/428, 429/430, 452
See application file for complete search history.

(56) References Cited

U.S. PATENT DOCUMENTS

| | | | | |
|---|---|---|---|---|
| 5,100,744 A | 3/1992 | Harashima | | 429/22 |
| 5,141,824 A | 8/1992 | Hirota | | 429/23 |
| 5,290,641 A | 3/1994 | Harashima | | 429/17 |
| 5,991,670 A | 11/1999 | Mufford et al. | | 701/22 |
| 6,339,313 B1 | 1/2002 | Adams et al. | | 320/121 |
| 6,379,826 B1 | 4/2002 | Lacy | | 429/13 |
| 6,423,434 B1 | 7/2002 | Pratt et al. | | 429/13 |
| 6,428,918 B1 | 8/2002 | Fuglevand et al. | | 429/13 |
| 6,451,467 B1 | 9/2002 | Peschke et al. | | 429/23 |
| 2003/0096147 A1 | 5/2003 | Badding et al. | | 429/30 |
| 2003/0228501 A1 | 12/2003 | Champion et al. | | |
| 2004/0033398 A1 | 2/2004 | Kearl et al. | | |
| 2005/0014044 A1 | 1/2005 | Thirukkovalur et al. | | |
| 2005/0271917 A1 | 12/2005 | Hoffjann et al. | | |
| 2006/0127710 A1 | 6/2006 | Schulte | | 429/13 |
| 2006/0257696 A1 | 11/2006 | Sridhar et al. | | 429/13 |

FOREIGN PATENT DOCUMENTS

| | | |
|---|---|---|
| EP | 0 419 163 | 9/1990 |
| EP | 0419163 A2 | 3/1991 |
| JP | 2007-103031 | 4/2007 |
| WO | 01/31727 | 5/2001 |
| WO | 02/31901 A2 | 4/2002 |
| WO | 2005/038973 A1 | 4/2005 |

OTHER PUBLICATIONS

"Chromium Poisoning of LSM-YSZ SOFC Cathodes", S. C. Paulson et al; Journal of the Electrochemical Society' 151 (11) A1961-A1968) 2004.

"Dependence of SOFC Cathode Degradation by Chromium-Containing Alloy on Compositions of Electrodes and Electrolytes"; Matsuzaki et al; Journal of the Electrochemical Society; 148 (2) A126-A131 (2001).

(Continued)

*Primary Examiner* — Gregg Cantelmo
(74) *Attorney, Agent, or Firm* — Siwen Chen; Svetlana Z. Short

(57) ABSTRACT

Disclosed is a segmented modular solid oxide fuel cell device having a plurality of independently controllable electrical power producing segments disposed within a common thermal environment. Also disclosed are methods for selectively operating one or more segments of the disclosed segmented modular solid oxide fuel cell device. Also disclosed are methods for performing a maintenance process on one or more segments of a segmented modular fuel cell device during fuel cell operation.

10 Claims, 13 Drawing Sheets

OTHER PUBLICATIONS

"Deposition of Cr Species at (La,Sr)(Co,Fe)$O_3$ Cathodes of Solid Oxide Fuel Cells"; San Ping Jiang et al; Journal of the Electrochemical Society, 153 (1) A127-A134 (2006).

"Chromium Vapor Species over Solid Oxide Fuel Cell Interconnect Materials and Their Potential for Degradation Processes"; Hilpert et al; J. Electrochemical Society; vol. 143, No. 11, Nov. 1996, p. 3642-3647.

"Interaction between chromia forming alloy interconnects and air electrode of solid oxide fuel cells"; Badwal et al; Solid State Ionics 99 (1997) 297-310.

"A comparative investigation of chromium deposition at air electrodes of solid oxide fuel cells"; Jiang et al; Journal of the European Ceramic Society 22 (2002) 361-373.

Fuel Cells—an Introduction R. Ramakumar, 0-7803-7173-9/01 2001 IEEE; p. 702-709.

"Optimal Design and Operation of Solid Oxide Fuel Cell Systems for Small-Scale Stationary Applications"; Braun; A dissertation submitted in partial fulfilment of the requirements for the degree of Doctor of Philosophy at the University of Wisconsin-Madison (2002) p. 1-275.

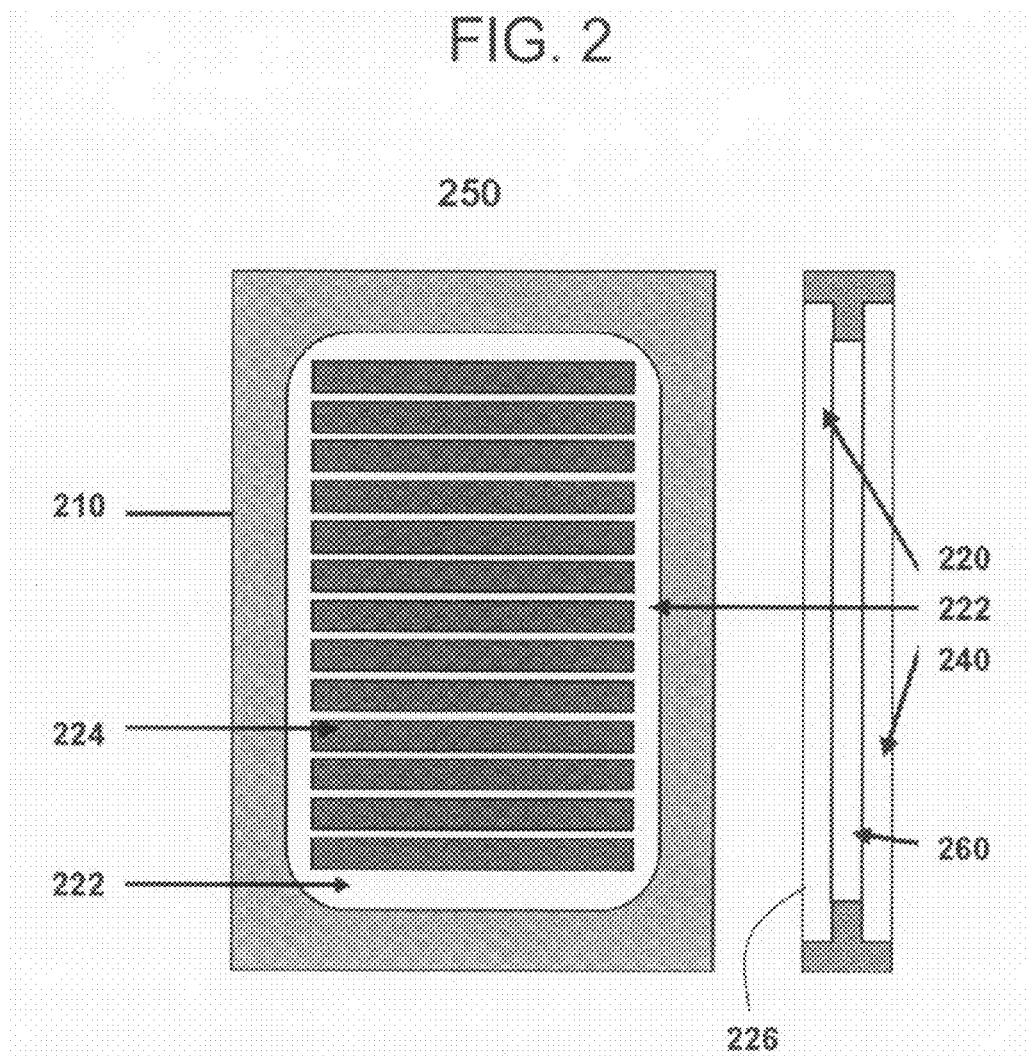
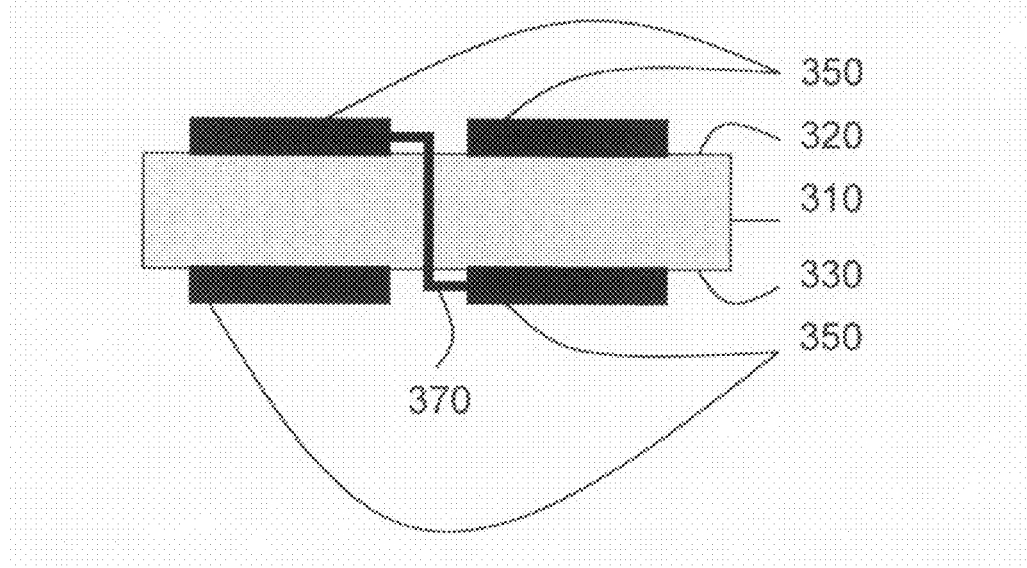

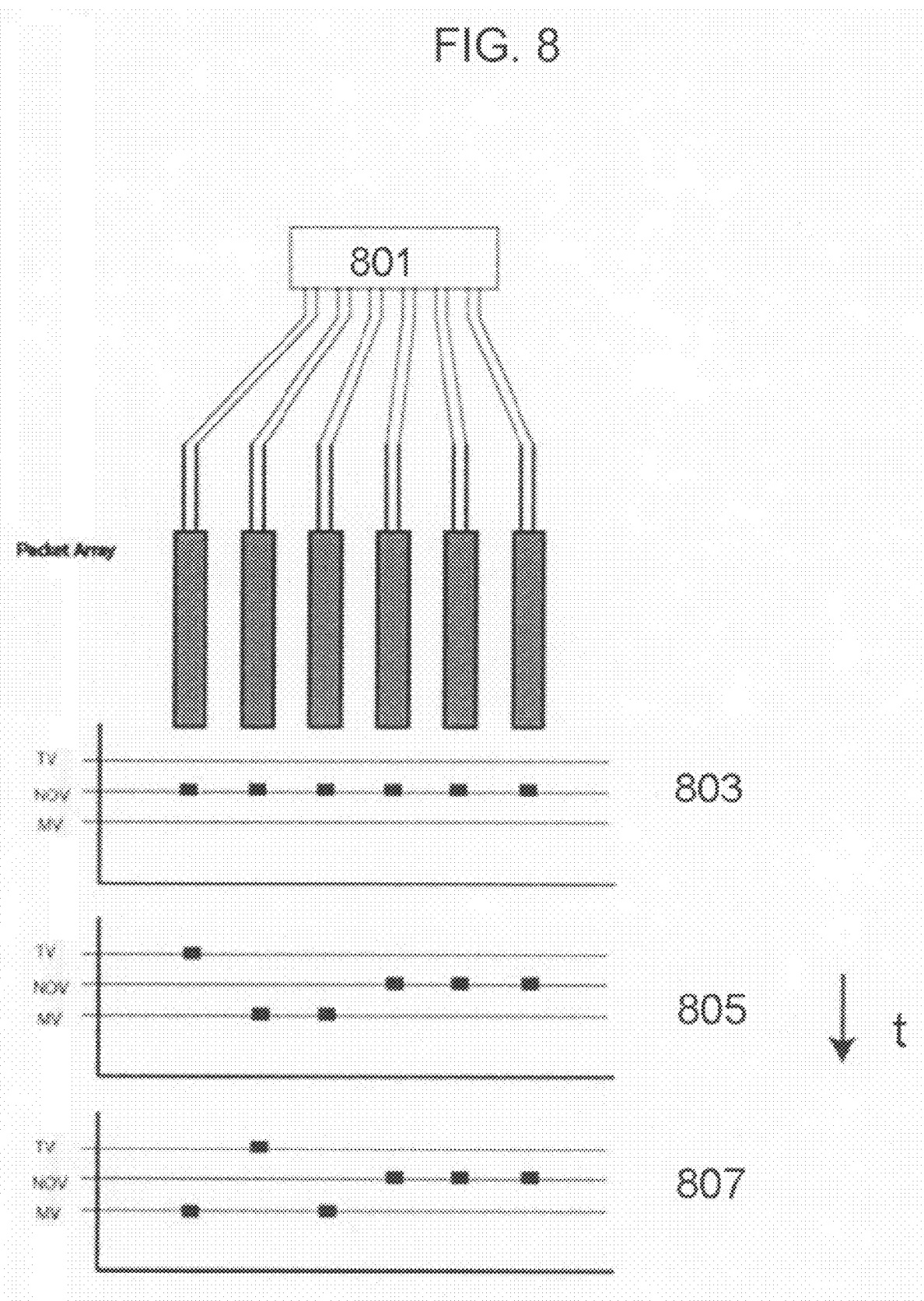

SEGMENTED SOLID OXIDE FUEL CELL STACK AND METHODS FOR OPERATION AND USE THEREOF

BACKGROUND

1. Field

The present invention relates generally to the field of solid oxide fuel cell devices and, more particularly, to modular solid oxide fuel cell devices and methods for the use and operation thereof.

2. Technical Background

Solid Oxide Fuel Cells (SOFC) have been the subject of considerable research in recent years. While SOFCs can theoretically provide more efficient conversion of chemical energy from a fuel into electrical energy than conventional combustion engines, challenges remain in designing fuel cell systems that are stable for extended operational lifetimes.

The high temperatures associated with SOFC operation and the materials conventionally used in SOFCs present numerous challenges for design and operation.

Exemplary challenges include reduction of thermal shock during fuel cell startup and shutdown. Conventional SOFCs require extended startup schedules so as to uniformly and slowly heat the entire fuel cell stack prior to operation without creating excessive thermal stresses and component failures. Other exemplary challenges include control of the power output of a stack or fuel cell device and performance and/or lifetime limitations resulting from contamination or poisoning of a component, such as an anode, cathode or electrolyte surface. Such contaminants can originate from the fuel and/or oxidant gas streams or can be present in other fuel cell components. The presence of contaminants, such as, for example, hydrocarbons or sulfur, in a fuel gas stream can, in some operational modes, result in poisoning of the anode. Other contaminants can include components of glass seals and chromium containing compounds from device components. Chromium compounds are frequently present in metal components of a fuel cell system, such as frame materials, gas conduits, and electrical interconnects.

In conventional SOFC systems, performance loss occurring during fuel cell operation can frequently require that the entire fuel cell system be shut down and be at least partially disassembled and/or replaced, resulting in extra costs, delays and loss of power output. Removal of contaminants can often require disassembly and either cleaning or replacement of the contaminated components. The present invention addresses these and other concerns and challenges associated with the design of SOFC systems through, in part, a modular SOFC design and methods of operation that provide cyclic regeneration and activation of the SOFC electrodes.

SUMMARY

The present invention provides a segmented modular solid oxide fuel cell having a plurality of individually controllable segments positioned within a common thermal environment; a method for operating such a fuel cell, wherein any one or more individually controllable segments can be selectively controlled; and a method for performing maintenance operations on a segmented modular fuel cell device.

In a first embodiment, the present invention provides a modular solid oxide fuel cell device having a maximum electrical power rating, comprising a plurality of "n" independently controllable electrical power producing segments, each electrical power producing segment having a maximum electrical power producing capacity and comprising at least one electrical power producing cell comprising at least one anode and at least one cathode, wherein the plurality of "n" independently controllable power producing segments are disposed within a common thermal environment.

In a second embodiment, the present invention provides a method for starting a solid oxide fuel cell device comprising a plurality of "n" independently controllable electrical power producing segments disposed within a common thermal environment, the method comprising determining a number "x" of independently controllable electrical power producing segments to be operated in a power producing mode, operating at least one of the independently controllable electrical power producing segments in a power producing mode, and then operating at least one additional independently controllable electrical power producing segment in a power producing mode, and then repeatedly operating at least one additional independently controllable electrical power producing segment until the number "x" of independently controllable electrical power producing segments are operating.

In a third embodiment, the present invention provides a method for shutting down a solid oxide fuel cell device comprising a plurality of "n" independently controllable electrical power producing segments in operation in a power producing mode disposed within a common thermal environment, the method comprising selecting at least one of the "n" independently controllable electrical power producing segments to be switched from a power producing mode to an idle mode, switching the at least one "n" independently controllable electrical power producing segments to an idle mode, and then selecting at least one additional independently controllable electrical power producing segments and switching the at least one additional independently controllable electrical power producing segment to an idle mode, and then repeatedly selecting and switching at least one additional independently controllable electrical power producing segment to an idle mode until all of the "n" independently controllable electrical power producing segments are in idle mode.

In a fourth embodiment, the present invention provides a method for controlling the operation of a solid oxide fuel cell device comprising a plurality of "n" independently controllable electrical power producing segments disposed within a common thermal environment, the method comprising determining a load on the solid oxide fuel cell device, and activating a sufficient number of independently controllable electrical power producing segments to supply power at a selected operating efficiency to meet the load.

In a fifth embodiment, the present invention provides a method of operating a fuel cell device comprising a plurality of "n" independently controllable power producing segments, the method comprising operating at least one of the "n" independently controllable power producing segments in a power producing mode, and simultaneously subjecting at least one of the "n" independently controllable power producing segments not operating in a power producing mode to an in situ maintenance process for a period of time.

Additional embodiments of the invention will be set forth, in part, in the detailed description, and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

The accompanying drawings, which are incorporated in and constitute a part of this specification, illustrate certain embodiments of the instant invention and together with the description, serve to explain, without limitation, the principles of the invention.

FIG. 2 is a schematic illustrating a packet according to one embodiment of the present invention.

FIG. 3 is a schematic showing of an anode and cathode according to one embodiment of the present invention wherein the anode and cathode are interconnected by a metal filled via.

FIG. 8 is an exemplary schematic control scheme according to one embodiment of the present invention.

DETAILED DESCRIPTION

The following description of the invention is provided as an enabling teaching of the invention in its best, currently known embodiment. To this end, those skilled in the relevant art will recognize and appreciate that many changes can be made to the various embodiments of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to a "fuel packet" includes embodiments having two or more such electrical contact points unless the context clearly indicates otherwise.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As used herein, a "wt. %" or "weight percent" or "percent by weight" of a component, unless specifically stated to the contrary, is based on the total weight of the composition or article in which the component is included.

As briefly summarized above, in one embodiment the present invention provides a modular solid oxide fuel cell device. In another embodiment, the present invention provides a method for operation of a modular solid oxide fuel cell device, wherein each of the plurality of modular fuel cell segments can be independently controlled to facilitate improved operation, such as, for example, load following, programmed start up and shutdown sequences, and combinations thereof. These methods of operation can provide a solid oxide fuel cell having greater flexibility and improved performance and operational lifetimes than conventional solid oxide fuel cell systems. In yet another embodiment, the present invention provides a method for operating any modular solid oxide fuel cell device, wherein at least one of a plurality of individually controllable segments of the fuel cell device can be subjected to a maintenance process.

Modular Solid Oxide Fuel Cell Device

Figure 1:
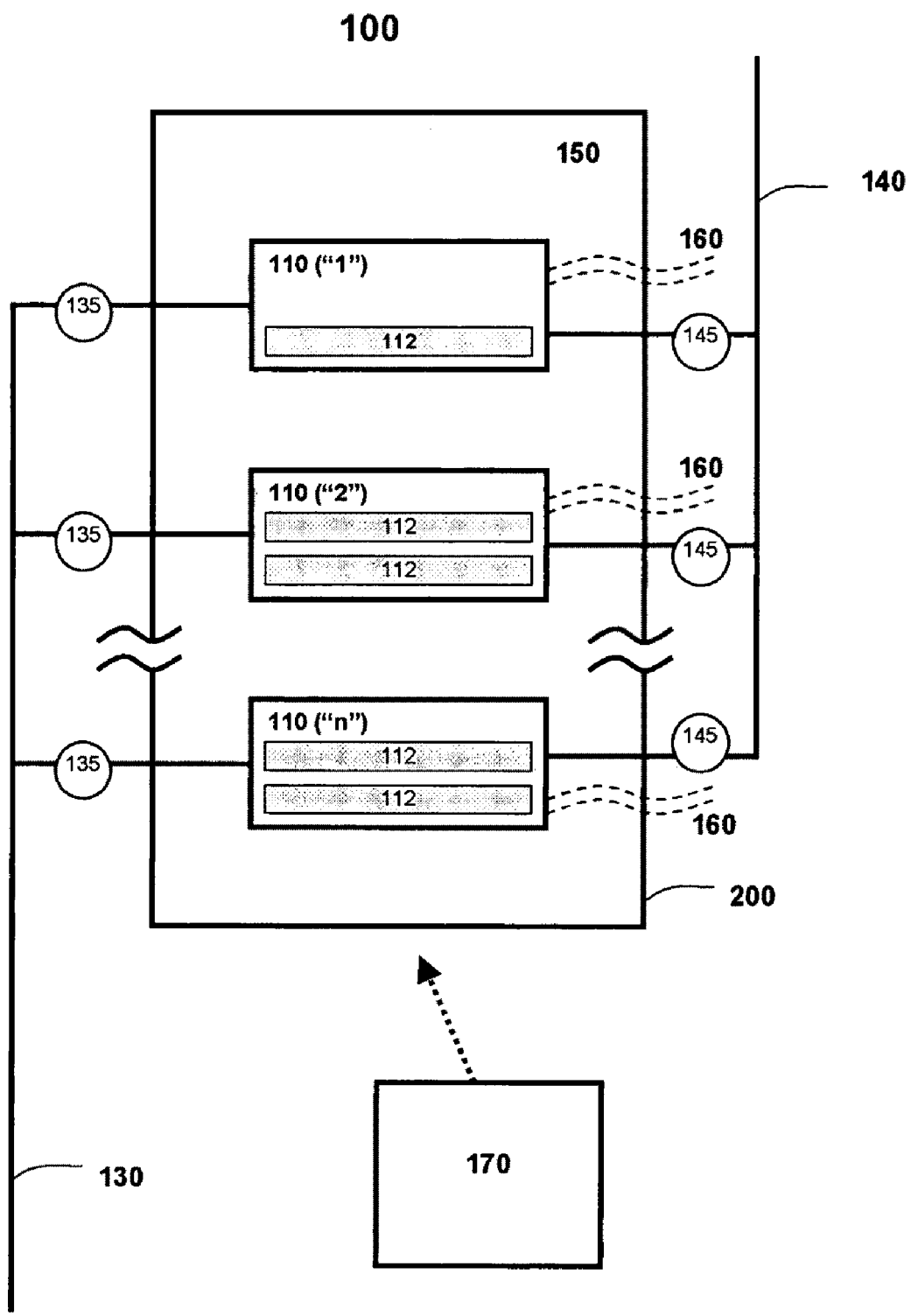
FIG. 1 is a schematic showing of an exemplary modular solid oxide fuel cell device according to one embodiment of the present invention.

With reference to FIG. 1, the solid oxide fuel cell device 100 of the present invention comprises a modular segmented design having a plurality of "n" individually controllable segments 110 disposed within a common thermal environment 150. The number and size of the "n" individually controllable segments in a solid oxide fuel cell device can vary depending on a specific design or application. In various embodiments, the solid oxide fuel cell device comprises from about 2 to about 100 individually controllable segments, for example, about 2, 3, 4, 5, 6, 8, 10, 20, 30, 40, 50, 60, 70, 80, 90, or 100 individually controllable segments. In one specific embodiment, the solid oxide fuel cell device comprises at least 3 individually controllable segments. In another specific embodiment, the solid oxide fuel cell device comprises at least 6 individually controllable segments. In other embodiments, the solid oxide fuel cell device can comprise more than 100 individually controllable segments and the present invention is not intended to be limited to a particular number of segments.

Each of the individually controllable segments of the solid oxide fuel cell device can comprise one or more individual cells 112, or pairs of anodes and cathodes. In one embodiment, a segment comprises one anode and one cathode. In another embodiment, a segment comprises a plurality, such as, for example, 2, 3, 4, 5, 7, 8, or pairs of anodes and cathodes. The specific number of individual anodes and/or cathodes in a segment can vary. Additionally, the number of individual cells in an individual segment can be the same or different from one or more other individual segments and it is not necessary that all segments comprise the same number of individual cells.

The modular solid oxide fuel cell device of the present invention can also have a maximum electrical power rating. Similarly, each independently controllable electrical power producing segment can have a maximum electrical power rating. If each of the independently controllable electrical power producing segments comprise the same number of cells, then the maximum electrical power rating for each segment is not more than 1/n maximum electrical power rating of the device. If any two or more of the independently controllable electrical power producing segments comprise, for example, a varying number of cells, have a varying thermal history, or are of varying quality, then the maximum electrical power rating for each segment can vary accordingly.

Each individually controllable segment can be coupled to an oxidant supply 130 and/or to a fuel supply 140. The flow and/or flow rate of the oxidant and/or fuel supply to each individually controllable segment can be adjusted independent of any other segments in the device. In various embodiments, the flow and/or flow rate of oxidant and/or fuel supplies can be controlled by manual or by automated means, such as, for example, through the use of metering valves 135 and 145, mass flow controllers, a control system, or a combination thereof. A control system 170, if utilized, can be capable of selectively introducing an oxidant and/or a fuel at a predetermined rate into at least one or more of the individually controllable segments. The specific composition and/or flow rate of any one or more oxidant and/or fuel streams can vary depending on the specific device, desired power output, and intended application, and the present invention is not intended to be limited to any particular oxidant and/or fuel composition or flow rate.

Each individually controllable segment of the fuel cell device can also have at least two external electrical connections 160, to which an external load can be applied, or across which an electrical potential can be applied or an electrical current passed. These external electrical connections can also be connected to a control system 170, one or more other individually controllable segments, or a combination thereof. The term "external" is not intended to imply that the physical connections need be positioned at any given place in or on the surface of an individual segment, but rather to distinguish such connections from any internal electrical connections that can exist between the external electrical connections and any one or more electrodes within the segment. Such internal electrical connections within a segment can be of any suitable design appropriate for operating the segment or fuel cell device. In one embodiment, a plurality of individual cells, or pairs of anodes and cathodes, within a segment, are connected in a parallel circuit. In another embodiment, a plurality of individual cells, or pairs of anodes and cathodes, within a segment, are connected in a series circuit. The specific connections and circuit design within any one or more individual segments can be the same or different from one or more other individual segments.

The arrangement or position of any one or more individually controllable segments within a solid oxide fuel cell device can be of any design suitable for the intended application, provided that at least a plurality of segments are positioned within a common thermal environment. In one embodiment, at least one of the individually controllable segments can be removed and/or replaced without affecting other individual segments in the device. The common thermal environment, in which at least two individually controllable segments are disposed, can be any suitable means for maintaining the same or substantially the same thermal profile across all individually controllable segments disposed within the common thermal environment. It should be noted that, due to power generation, and depending upon, for example, the specific load applied to any one or more individually controllable segments, the localized temperature and/or thermal profile of a segment or the area immediately adjacent thereto can vary. For example, a plurality of about 6 individually controllable segments can be positioned within a common thermal environment. Any one or more of the individually controllable segments can be operated individually or in combination with any other segments. If, for example, one of the individually controllable segments is operated in a power producing mode, that segment can generate heat that can, for example, radiate and heat other adjacent segments disposed within the common thermal environment. After a period of operation, all of the individually controllable segments disposed within the common thermal environment can have the same or substantially the same temperature. Due to the relatively lower thermal mass of an individual segment, it may be brought to temperature more quickly, relative to the entire device. Once the initial segment or subset of segments is operating, they may then be loaded with low resistance to generate heat. To this end, operating segments can act as internal heating elements for other portions of the device. According to this embodiment, the electric energy required for heating the segment to operating temperature is reduced as heat cascades from an initial subset to the entire device.

The segmented modular solid oxide fuel cell design of the present invention can provide various advantages over conventional fuel cell designs, such as, for example, the ability to selectively operate any one or more individually controllable segments at a given time, adjust the power output from the fuel cell device as the load on the device varies, and the ability to control the startup and shutdown of the fuel cell device to control the power output, speed of startup and/or shutdown, and minimize thermal stresses on materials and components within the fuel cell. The common thermal environment of the solid oxide fuel cell device of the present invention and the ability to maintain a common thermal profile for all individually controllable segments can also be advantageous by, for example, allowing one or more individually controllable segments in operation to heat up and/or prepare any other segments for operation without the need for separate heaters, thermal control systems, or heat up schedules. The segmented modular design can allow improved reliability of the fuel cell device by enabling operation of the device or a portion thereof under impaired conditions that would previously have required a complete shut down of the stack to address.

In one specific exemplary embodiment, a segmented solid oxide fuel cell can be that described in U.S. Patent Publication 2003/0096147 to Badding et al. (now abandoned), which is hereby incorporated by reference in its entirety and for the purpose of providing a solid oxide fuel cell design.

In another exemplary embodiment, and not intended to be limiting, a segment of a segmented modular solid oxide fuel cell device can comprise one or more fuel packets and one or more oxidant packets. As exemplified in FIG. 2, each fuel packet 250 can comprise a frame 210 which can support a first electrode assembly 220 and a second electrode assembly 240, and an anode chamber 260 disposed therebetween. The first electrode assembly can comprise a first planar electrolyte sheet 222 having a plurality of anodes 224 disposed on a first surface 226 thereof. A plurality of cathodes can also be disposed on an opposed second surface of the first electrolyte sheet. The second electrode assembly 240 can similarly comprise a second planar electrolyte sheet also having a plurality of anodes disposed on a first surface thereof. A plurality of cathodes can also be disposed on an opposed second surface of the second electrolyte sheet. With reference to FIG. 3, the plurality of electrodes 350 deposited on the opposed first 320 and second surface 330 of an electrolyte sheet 310 are in electrical communication, provided by electrical vias or metal filled conduits 370 extending through the electrolyte sheet from the first surface to the opposed second surface thereof and to form multiple cells in series.

In this embodiment, the fuel cell packet frame can then support the first and second electrode assemblies such that the respective first and second electrode assemblies are separated from one another and such that the respective first surfaces of the respective first and second electrolyte sheets face each other and define an anode chamber. Still further, the fuel cell packet frame can define a fuel inlet in fluid communication with the anode chamber for introducing fuel into the anode chamber.

Similarly, an oxidant packet can comprise a body having a pair of opposed and spaced apart side walls and further defining an interior volume therebetween. The body can form an oxidant inlet port in fluid communication with the interior volume, and at least one outlet port also in fluid communication with the interior volume.

With reference again to FIG. 1, a fuel cell housing 200 can support a plurality of "n" segments in a stacked arrangement. Within each segment, one or more multiple fuel packets can be placed together with intervening oxidant packets to form a fuel cell segment. In one specific embodiment, the plurality of modular oxidant packets are positioned in spaced opposition and define oxidant chambers therebetween, wherein each of the modular fuel packets is positioned within one of the oxidant chambers. According to this embodiment, the oxidant packets separate the fuel packets. Further, the oxidant outlets of an adjacent pair of modular oxidant packets are in fluid communication with the oxidant chamber defined therebetween to supply oxidant to the cathode sides of neighboring fuel cell packets disposed in the oxidant chamber. The oxidant inlet and outlets can also be connected together via either internal or external plenums that can transport fresh oxidant to each packet and that can exhaust any spent oxidant.

Figure 4:
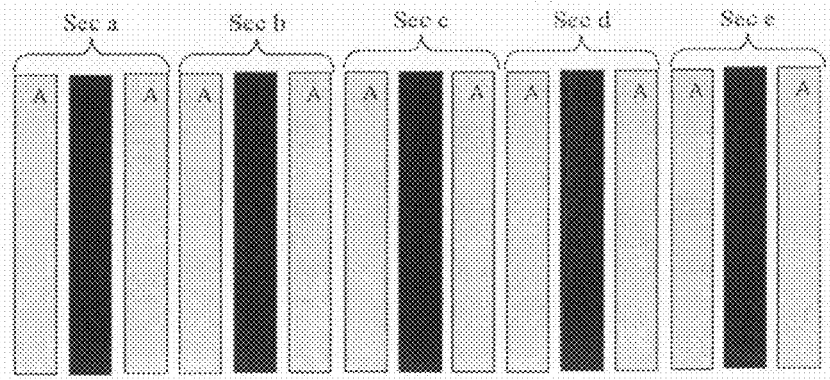
FIG. 4 is a schematic showing of a segmented fuel cell stack according to one embodiment of the present invention.

The individual selectivity or addressability of the plurality of segments in this embodiment is shown schematically in FIG. 4. By dividing the stack into segments, each segment can be operated independently. For illustration of the segments, dual oxidant packets are shown at the boundaries of the segment; however, it should be understood that these are not required as a single oxidant packet can be used to introduce oxidant to each of the neighboring fuel cell packets. Further, the individual packets or even subgroups of individual packets within the modularized fuel cell device of the present invention can be selectively operated in any desired combination at any given time.

Figure 5:
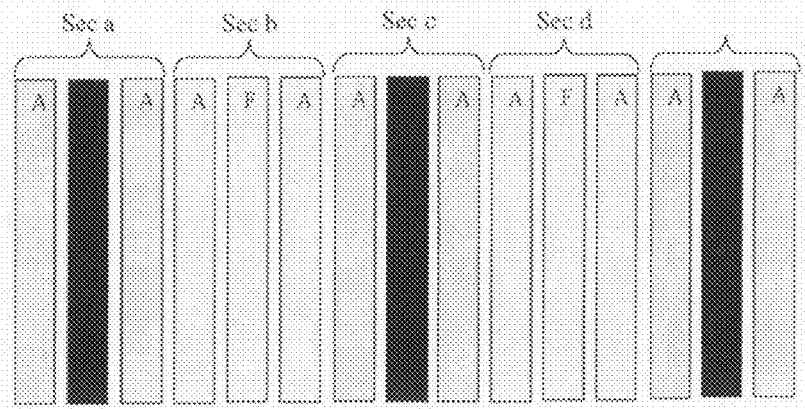
FIG. 5 is a schematic showing of a segmented fuel cell stack according to one embodiment of the present invention.

For example, FIG. 5 further demonstrates an exemplary fuel stack comprised of five segments, "a," "b," "c," "d," and "e." Each segment is comprised of a fuel packet (F) interposed between two oxidant packets (A). In FIG. 5, fuel packets that are in a power producing mode are represented by dark shaded bars. To that end, segments b and d are not in an operating mode due to, for example, these segments not being fueled. Simultaneously, segments a, c, and e are however active having fuel gas routed through their corresponding fuel packets. In this example, the isolated segments are interposed between active or operating segments. Further, the overall power available from the unit has been reduced to approximately 60% (3/5 of the available cells are now producing power). However, excess heat from the power producing segments is still available to keep the un-fueled sections at or near operating temperature and ready for eventual use. Thus, in this example, if the overall fuel stack had been running at less than about 50% of the required power across all segments prior to isolation of segments b and d, the remaining sections after isolation would then be operating at a higher efficiency. Further, if there were failures in either of segments b or d, the ability to isolate such segments enables the failed segments to be removed from the system without requiring a total interruption of the fuel cell stack operability.

Figure 6:
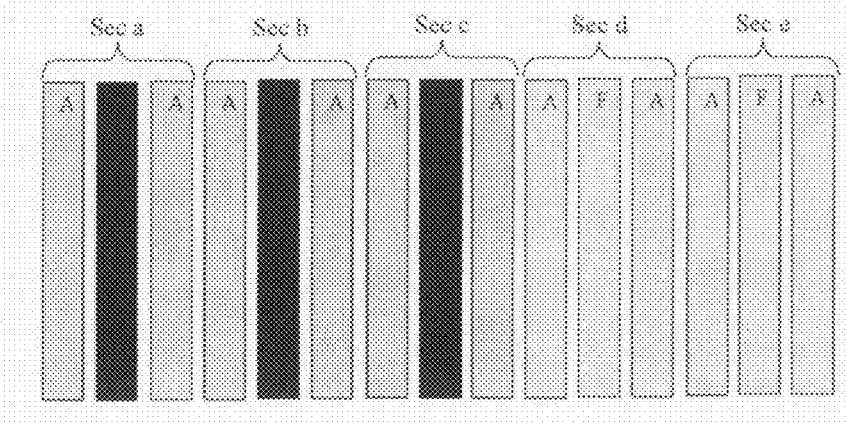
FIG. 6 is a schematic showing of a segmented fuel cell stack according to one embodiment of the present invention.

Similarly, FIG. 6 also demonstrates an exemplary segmented fuel cell stack comprised of five segments, "a," "b," "c," "d," and "e." Once again, each segment is comprised of a fuel packet interposed between two oxidant packets. In this example, segment d and e are not in an operating mode due to, for example, these segments not being fueled. Segments a, b, and c are however active and having fuel gas routed through their corresponding fuel packets. In contrast to the stack of FIG. 5, in this example the isolated segments are not interposed between active or operating segments and are instead positioned at an end of the stack. As with the stack of FIG. 5, the stack exemplified in FIG. 6 would again reduce the overall power available from the unit to approximately 60% (3/5ths of the available cells are now producing power).

Figure 7:
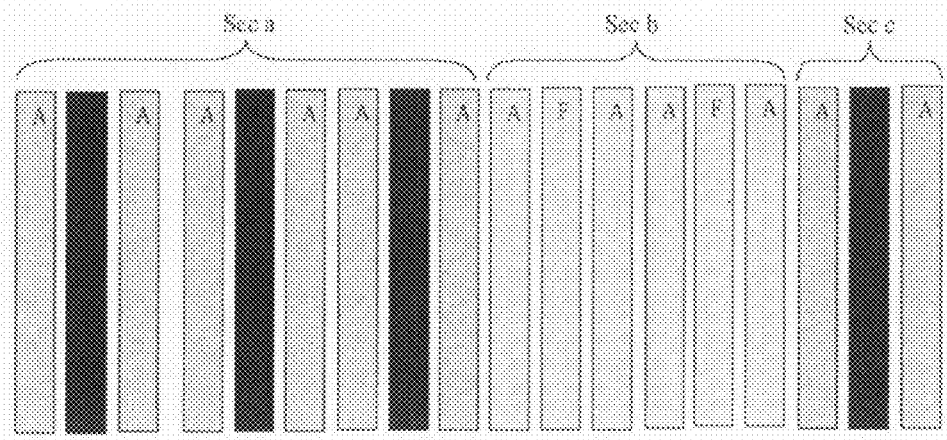
FIG. 7 is a schematic showing of a segmented fuel cell stack according to one embodiment of the present invention.

In still a third exemplary segmented operation scheme, FIG. 7 demonstrates fuel cell stack comprised of six segments, wherein each segment is again comprised of a fuel packet interposed between two oxidant packets. The six segments are further divided into three selectively operational sections. As shown, each of the three sections are not comprised of equivalent numbers of packets. Segment "a" is comprised of three substacks within segment "a", segment "b" is comprised of two substacks, and section "c" is comprised of one substack. It can be seen that by selectively operating various combinations of these unequally sized segments, the output of the overall fuel cell stack can be varied. For example, the embodiment shown in FIG. 7 can operated at full power by operating all segments or, alternatively, can be operated at $1/6^{th}$, $1/3^{rd}$, $1/2$, $2/3^{rds}$, and $5/6^{ths}$ of full power by selectively controlling the three sections.

The various embodiments illustrated in FIGS. 6-9 are exemplary of specific variations attainable utilizing the segmented fuel cell stack design of the present invention. It should be understood that any desired scheme of segmented fuel cell stack operation can be attained according to the device of the instant invention and will depend upon the number of "n" segments within a given stack and the power requirements for the intended application.

Operation of Modular Solid Oxide Fuel Cell Device

As described briefly above, the segmented modular solid oxide fuel cell device of the present invention can allow selective operation of any one or more individually controllable segments disposed within the common thermal environment. Any individually controllable segment can be operated in a power producing mode or an idle mode in either a static or dynamic pattern, such as, for example, can be determined by a control system. The term "power producing mode" is intended to refer to operation of an individually controllable segment in a manner such that at least one oxidant and at least one fuel are introduced into the segment, and an electrical potential is generated across the external electrical connections of the segment and/or an electrical current can be passed between the external electrical connections and an external load connected to the segment. The term "idle mode" is intended to refer to an individually controllable segment that is not in power producing mode, such as, for example, a segment to which no fuel or oxidant has been provided, a segment to which a quantity and/or type of fuel and/or oxidant not typically used in a power producing mode has been provided, or a segment that has been electrically isolated from a load or that is at open circuit voltage (OCV). The ability to control and operate one or more segments of the solid oxide fuel cell device in various combinations can be used, for example, for startup and shutdown schedules, and for balancing and/or dynamically changing the device power output in accordance with the demand of an external load.

In one embodiment, the segmented modular solid oxide fuel device of the present invention can be operated in a startup mode to provide a ramped output of power over a period of time. Such a startup mode can also improve efficiency and extend the operational lifetime of a device by, for example, controlling the rate of temperature change of fuel cell components. Certain components of solid oxide fuel cell devices, such as, for example, an electrolyte sheet and various electrode surfaces can have materials limitations and can be adversely affected by rapid changes in temperature. A controlled startup mode can allow tailored control over the rate of temperature change of such components and decrease the risk of premature component failure related to temperature changes. The specific steps and/or sequence of a particular startup mode can vary and the present invention is not intended to be limited to a particular sequence of steps. In one embodiment, a target number of individually controllable segments intended to be operated can be determined. Then, at least one of the independently controllable segments can be operated in a power producing mode, after which one or more additional individually controllable segments can be operated in power producing mode. The number of sequential steps and/or the number of individually controllable segments within each step can vary. In an exemplary embodiment, each step comprises the operation of one additional segment. In another embodiment, each step comprises the operation of a varying number of additional segments.

In one embodiment, the number and pattern of individually controllable segments within each step of a startup mode can be designed such that the operation of one or more individual segments generate heat that can radiate to adjacent segments. As both the amount of energy and time required to initially heat a conventional solid oxide fuel cell to operating temperature can be significant, such an operational scheme can be used to provide a faster heat up schedule and/or device startup by utilizing the radiant heat from operating segments positioned within the common thermal environment to heat adjacent and/or nearby segments. Thus, power output can potentially be provided at an earlier time in the startup schedule, and the entire device can potentially reach operational temperature faster than with conventional designs.

In another exemplary embodiment, a solid oxide fuel cell device comprises five individually controllable segments positioned adjacent to each other in a linear fashion. Initially, the second segment can be operated in a power producing mode, generating heat and raising the temperature of at least the first and third segments. Next, the fourth segment can be operating in a power producing mode, generating heat and raising the temperature of the third and fifth segments. Alternatively, after the second segment has been operated in a power producing mode for a period of time and the temperature of the third segment increased, the third segment can be operated in a power producing mode, thus heating the fourth segment. This sequential pattern of operating segments can be continued until the number and/or pattern of segments desired to be operated is reached.

In a similar manner, the shutdown sequence of a solid oxide fuel cell device can be controlled to reduce power output and control the temperature cooling profile of the individually controllable segments and the components therein. In such an operational shutdown scheme, at least one of the individually controllable segments operating in a power producing mode can be selected and switched to an idle mode. As in the startup mode described above, one or more steps comprising the selection of additional segments can be performed, wherein the selected segments are switched from a power producing mode to an idle mode. This process can be repeated until all of the individually controllable: segments are in idle mode. The specific number and pattern of segments within each of the one or more steps can be designed as appropriate for a specific fuel cell device or application.

The segmented modular solid oxide fuel cell device of the present invention can also be operated in a manner such that the number of individually controllable segments operated in a power producing mode, and thus the power output of the device can be adjusted as necessary based on one or more external loads connected to the device. In an exemplary embodiment, additional segments can be placed in a power producing mode in a dynamic manner as the magnitude of an external load increases. The additional segments positioned within the common thermal environment with the segments already operating in a power producing mode will be either at operating temperature or will require minimal additional heating to reach an operating temperature.

In an exemplary embodiment, individual segments can be "turned down" through a combination of electrical isolation from the load, reducing or eliminating gas feed, and/or increasing cooling air flow. Thus low power output can be fine-tuned at various and even continuous levels. In addition, the operating life of the stack can be prolonged by varying the segments which are in the "hot" state, since lowering the temperature can reduce decay rates.

To selectively operate the one or more individually controllable segments described herein, it is contemplated that a control system having one or more controllable parameters will be provided. For example, in one embodiment, the control system can selectively introduce fuel into at least one or more of the segments. Thus, the flow of a fuel gas to an individual segment can be controlled independent of fuel flow to other segments within a fuel cell stack or device. It is further contemplated that, not withstanding the selective operation of individual segments, the oxidant flow can be maintained in circulation throughout the entire fuel cell device to provide for cooling and to bring thermal equilibrium to the system. Alternatively, the oxidant flow can also be selectively controlled to provide oxidant only to segments being operated in a power producing mode. Accordingly, in another embodiment the control system can be configured to selectively introduce oxidant gas into one or more segments. It should also be understood that the control and selectivity of the segments is not static and can actually be varied in real time. Therefore, in another embodiment, the control system can first selectively introduce a fuel gas into a first predetermined number of segments. Following this first introduction of the fuel gas into a subset of the segments, the fuel gas can subsequently be introduced into a second predetermined number of segments.

The control system can also be configured to detect and respond to one or more operational parameters of the fuel cell stack or device. To that end, in addition to control of the fuel or oxidant supply described above, the control system can monitor the physical connections of oxidant, fuel, and electricity, and can respond to detected predetermined parameters in order to optimally maintain operation of the fuel cell stack in view of such detected parameters, also known as providing a balance of plant or BOP. To that end, in one embodiment, the control system can detect a parameter pertaining to the electrical output of the stack. A flow of at least one of a fuel gas and/or an oxidant gas to any one or more segments can then be adjusted to, for example, control the electrical output of the device. Alternatively, the control system can also be configured to detect a parameter pertaining to the operating potential and/or current of the device. As such, based upon this detected parameter, the flow of at least one of a fuel gas and/or an oxidant gas to any one or more of the segments can be adjusted to maintain a constant operating potential and/or current for the solid oxide fuel cell device.

In an exemplary embodiment, the control system can monitor the external load on the fuel cell device through a control algorithm such as fuzzy logic that performs a time integrated calculation of the average cell current densities within the stack. At a point when the external load has decreased to a point such that the time integrated current densities fall below a predetermined value, fuel to certain segments can be selectively isolated or turned-off by, for example, switching the selected fuel segment to an idle mode or by introducing an inert gas in place of a fuel gas into the selected segment. The one or more isolated segments are thus removed from the power output circuit. The remaining segments that are in a power producing mode can exhibit a boost in current densities improving the electrical conversion efficiency. As the external load increases, the control system can monitor such increase and return a previously isolated segment to a power producing mode at a time when the average current densities of the segments in power producing mode has risen above a predetermined value and they are returned to the power output circuit.

While any conventional means for selectively controlling the rate and pressure of the fuel and oxidant flow to a segment can be used, it should be appreciated that the dynamics of selectively turning on and off fuel and oxidant flow should be controlled in such a way that the segments are not damaged. For example, in one embodiment it is preferred for the rate of oxidant or fuel flow to be ramped up in a manner in which the corresponding pressures are controlled to ensure that the electrolyte sheets of a given segment or cell positioned within a segment do not rupture. Likewise, when selectively turning off or interrupting the flow of fuel, it may also be preferred to ramp down the flow in order to ensure that no pressure spike is generated in the remaining segments, possibly exposing them to potential damage. Exemplary methods for such flow control can include a mass flow controller or a variable speed control on a blower fan. It should be understood that the particular choice of method will depend at least in part upon such factors as range of operation, reliability requirements and potentially size and efficiency for the particular application.

Likewise, it should be understood that any desired management of the electrical power within the fuel cell device will be application dependent as well. For example, in an embodiment where the electrical outputs of the individually controllable segments are wired in parallel, means can be provided to prevent currents from circulating from the active sections to the inactive sections, wasting electricity and potentially harming the inactive sections. The means can include, for example, a manipulation of switches, either mechanical or solid state, or by adding diodes on the output of each cell to keep recirculating currents from back flowing into unused or "offline." In another embodiment where in the fuel cell device application utilizes less impact on the load, it may be preferred to first bring any segments in idle mode up to the voltage of the active packets and then switch them into the load. Still further, when turning down a fuel cell device, it may also be preferred to gradually decrease the load on the segments that will be isolated or placed in idle mode while gradually increasing the fuel and oxidant flow to the segments that will remain in operation.

Maintenance of Individually Controllable Segment

The present invention also provides a method for performing a maintenance process, such as, for example, regeneration and/or activation of a fuel cell electrode, on at least one individually controllable segment of a segmented fuel cell device. It should be noted that the method and various embodiments described herein can be performed on any segmented or modular fuel cell device in which the segments are individually controllable and the method and various embodiments are not limited to the solid oxide fuel cell device having a common thermal environment described above.

A maintenance process can be useful when, for example, one or more segments of a segmented fuel cell device are not functioning and can be repaired, replaced, and/or treated to improve performance of the one or more segments and of the entire device. In various embodiments, a single segment can be removed from operation as described above and isolated from the remaining segments. This isolation can be performed in a static manner or can be performed on multiple segments in a programmed manner to periodically treat each of the segments of a fuel cell device.

In various embodiments, the present invention provides a method of operating a solid oxide fuel cell device comprising a plurality of "n" independently controllable power producing segments, wherein at least one of the independently controllable segments is operated in a power producing mode while simultaneously subjecting at least one of the segments not operating in a power producing mode to an in situ maintenance process for a period of time. The number of segments subjected to the maintenance process can vary, provided that at least one of the segments continues to operate in a power producing mode. The maintenance processes described herein can improve the performance, power output, and/or operational lifetime of a segment and can result in the segment, after being subjected to the maintenance process, having at least one of a greater power output, higher efficiency, and/or improved operational lifetime over a similarly situated segment not having been subjected to the same maintenance process.

Any one or more segments can be subjected to a maintenance process in a single static step, or a programmed operational scheme can be determined whereby a plurality or all of the segments can be subjected to a maintenance process at various predetermined intervals. The selection of any one or more segments, if any, to be subjected to a maintenance process, can be determined, in part, by monitoring at least one performance property of the segment and/or the fuel cell device. Such performance properties can include voltage output, temperature, efficiency, along with any other such properties that can provide an indication of a decrease in performance and/or the need for a particular maintenance process to be performed.

In various embodiments, a maintenance process can include any one or more of the following: applying an electrical potential between the at least one anode and the at least one cathode, subjecting the at least anode to one or more potential cycles, exposing the at least one anode to air and/or an oxygen containing atmosphere, adjusting the magnitude of an electrical load electrically connected to the at least one anode and the at least one cathode, removing any electrical load connected to the at least one anode and/or the at least one cathode such that the segment is at open-circuit voltage, passing an electrical current between the at least one anode and the at least one cathode, and exposing at least one cathode to a low oxygen content atmosphere. A low oxygen content atmosphere can be any suitable environment and/or gas composition comprising an amount of oxygen either lower than that of air and/or lower than that typically used in an oxidant. In one embodiment, the process conditions should be sufficient to remove and/or render inert at least a portion of an impurity present on a surface of at least one electrode. If performed due to the presence of an impurity or reaction product, for example, that blocks at least a portion of the active oxygen exchange sites on an electrode surface, the process conditions, for example, application of an electrical potential, should be sufficient to reactivate and/or make available at least a portion of the at least partially blocked and/or non-active sites.

An exemplary control scheme, as illustrated in FIG. 8, can comprise a control box 801 programmed to cyclically treat individual segments within the device with any of the treatments described below. In a first exemplary condition 803, all segments within the device are operating at a normal operating voltage (NOV). At some time, the controller initiates a treatment sweep 805, 807, wherein the first segment voltage is adjusted 805, either by modifying its loading condition, or by applying an external potential, to a "treatment voltage" (TV). To maintain transparency to the end user, other segments can be loaded to draw more power, such that the total device output is unaffected by the segment undergoing maintenance at the TV potential. The increased loading may, for example, be achieved by uniformly increasing the current draw from other segments, or selected segments can be brought to a "mitigating voltage" MV to manage, for example, the uniformity of the device's thermal profile.

The methods of the present invention provide, in various embodiments, the ability to recover or improve in-situ performance by regeneration and/or activation of one or more of the segments without requiring an interruption in the operation of the fuel cell device. To maintain operational performance of individual segments, "regeneration" or "activation" processes can be periodically carried out on individual or groups of segments. Regeneration maintenance processes can be conducted either as a periodic sweep, wherein "regeneration/activation" conditions are applied to one or more segments or as individual application when an individual segment exhibits a non-desired performance. By utilizing a rolling in-situ performance recovery/regeneration/activation scheme of individual segments, the reduction in performance of a degrading segment can be addressed while maintaining the overall device performance at a substantially constant level.

Figure 9:
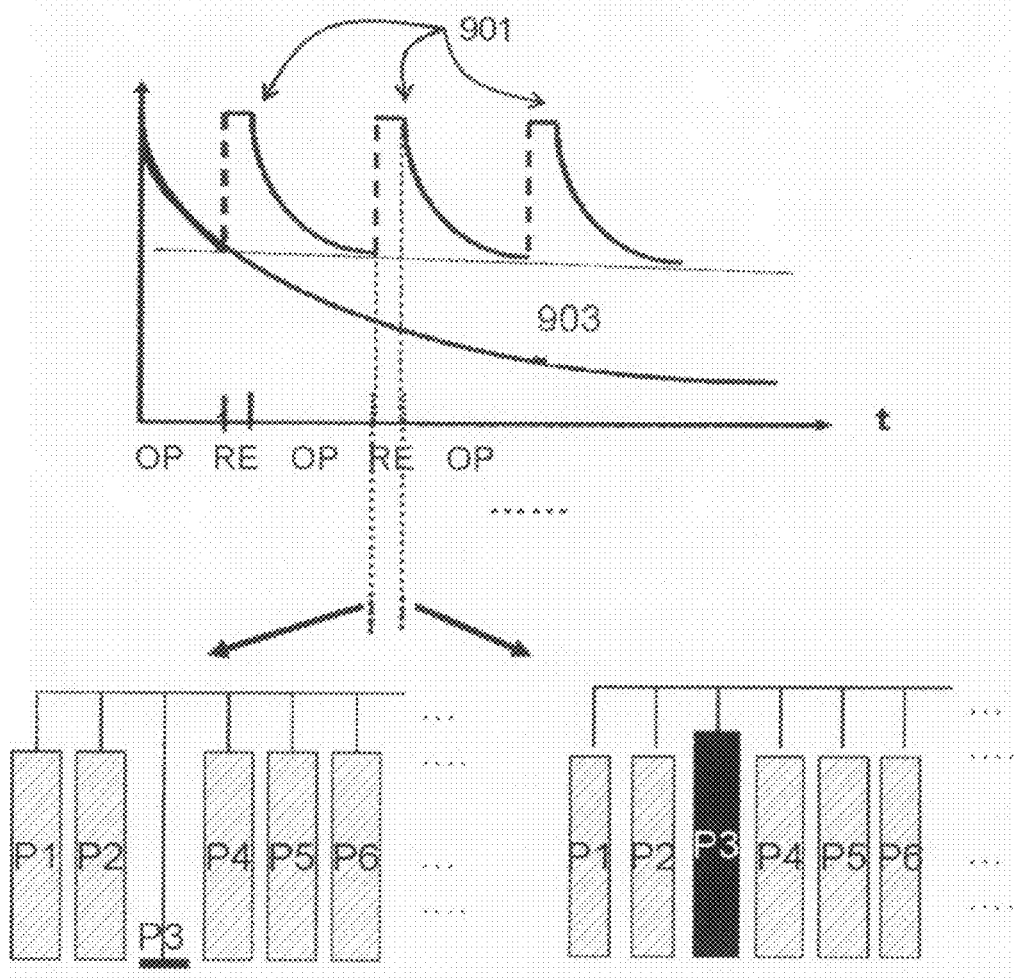
FIG. 9 schematically shows an exemplary power output recovery by cyclic regeneration of one segment (number 3) of a fuel cell stack according to one embodiment of the present invention.

Exemplary in-situ performance recovery can include, without limitation, at least partial recovery of reversible performance loss of cathodes due to chromium oxide poisoning, at least partial recovery of performance loss due to coking of the anode, at least partial recovery of performance loss due to sulfur poisoning of the anode, electrochemical activation of the cathode by cathodic current polarization, and activation of the anode by redox cycling. Other maintenance processes can also be performed depending on the nature of performance degradation and the composition and design of a given segment, and the present invention is not intended to be limited to a particular maintenance process. To that end, FIG. 9 schematically shows an exemplary cyclic operation of a fuel cell stack with segment P3 undergoing in situ maintenance. The segment P3 is decoupled from the stack's power production at the beginning of the recovery operation (RE) and is subsequently reintroduced into the stack power production (OP) after the maintenance process. The upper portion of the graph 901 illustrates the performance over time of the regenerated segment. The lower portion of the graph illustrates the performance over time 903 of a corresponding non-regenerated segment over time. The cyclic operation and recovery allows the segment to recover lost performance and exhibit a higher performance when it is reintroduced in the circuit. In contrast, the non-regenerated segment suffers from continuous degradation over time.

The method of cyclic performance recovery exemplified above can be used for various modes of electrode activation or regeneration. In one embodiment, the cyclic maintenance can be used to at least partially reverse performance loss due to the existence of a contaminant, such as poisoning by a chromium containing compound. Chromia- and chromium-containing materials are in thermodynamic equilibrium with a number of different gaseous oxide species that have non-negligible partial pressure at temperatures as low as 700 C. Cr(VI) species are the dominant species under oxidizing conditions. Thus, partial pressure of such species can reach up to $10^{-5}$ Pa over $Cr_2O_3$ and increases rapidly with increasing temperature and water vapor pressure. In humid air, chromium oxy-hydroxide is the dominant species, and, depending on the $P_{H2O}$, its vapor pressure can be up to a factor of 100 higher. Many SOFC frame materials, gas conduits and interconnects are made of steel, and thus can readily produce Cr(VI)oxide/hydroxide vapor within the cathode chamber.

These Cr(VI) oxide/hydroxide gaseous species can penetrate the porous cathodes of a solid oxide fuel cell and in presence of strong cathode polarization, "electrochemically assisted Cr-poisoning" can occur. To that end, the cathodes can suffer severe performance degradation due to the reduction of $Cr^{6+}$ species on the cathode or electrolyte surface and the formation of $Cr^{3+}$ mixed oxides that cover the surface and consequent inhibition of the oxygen incorporation into the cathode. It has been discovered that at least a portion of cathode degradation is reversible. Further, the recovery of cathode performance in the absence of polarization can occur relatively rapidly, i.e., in a matter of minutes. Accordingly, pursuant to the methods of the present invention, the segmented solid oxide fuel cell can be operated in a cyclic manner to improve the average power density of the fuel cell stack over time.

During a maintenance process, the cathode polarization can be suppressed by first selectively isolating a predetermined segment from the device power output in a non-operating mode. Once isolated, suppression of the cathode polarization can be reached in an open circuit condition either by exposing the anode to an oxygen containing atmosphere, such as, for example, air or nitrogen with residual oxygen, or by slowly lowering the cathode oxygen chemical potential by flowing gas with lowered oxygen activity across the cathode. To periodically and cyclically remove the reversible chromic oxide deposited on a cathode, the cyclic maintenance treatment as described can be implemented in the device by switching one or a subset of segments to open circuit conditions followed by the above-described treatment. After one segment or a subset of segments have been activated, one or more subsequent sets of segments can be treated.

In another embodiment, the methods of the present invention can be used to selectively de-coke and/or desulfurize one or more anodes present in a fuel cell device. To this end, the anode decoking and/or desulfurization can be achieved by increasing the oxygen partial pressure around the anode. The oxygen partial pressure can be increased by selectively switching from a fuel gas composition to an oxygen-rich gas composition. Alternatively, anode decoking and/or desulfurization can also be achieved by electrochemically increasing the oxygen activity at the anode. An electrochemical increase in oxygen activity can be achieved by shorting the packet to a high current density, which can raise the oxygen activity at the anode. Alternatively, high flux densities of oxygen can be pumped through the electrolyte to the anode. Still further, the packet can also be "reverse polarized" to substantially raise the anode oxygen activity in order to oxidize off accumulated sulfides and coke.

In still another embodiment, it is contemplated that activation of the anode during an in situ maintenance process can comprise redox-cycling. For example, an exemplary nickel based anode can be oxidized and reduced by redox cycling to provide fresh, highly active catalytic anode surfaces. Further, the process can be particularly well suited if the anode undergoes, during its operation, alloy formation or surface poisoning. To that end, oxidation typically redistributes the formed alloy and any impurity elements that may be present to provide a fresh highly active catalytic metal surface.

Figure 16:
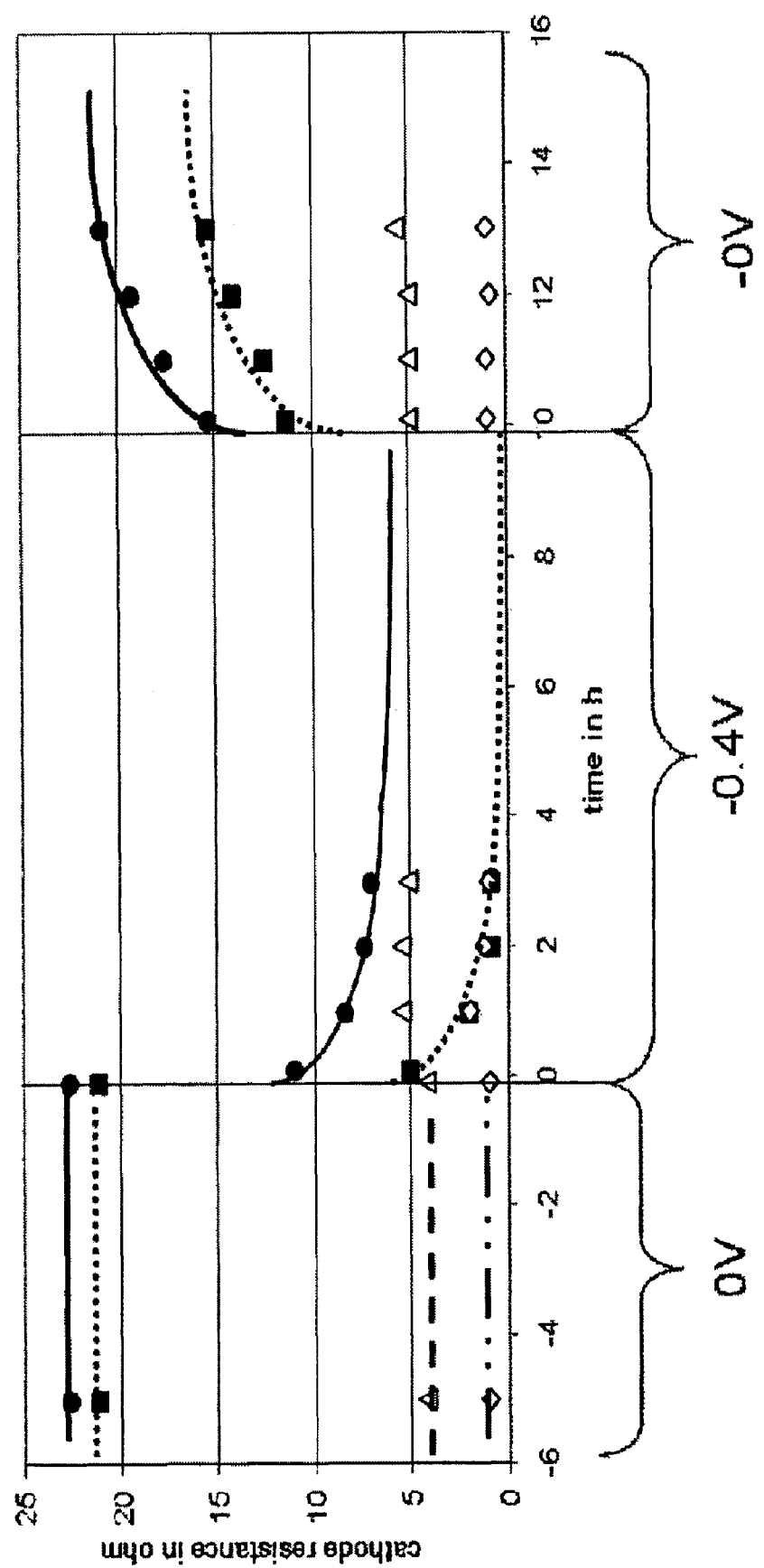
FIG. 16 illustrates electrochemical activation of a cathode and the resulting improved cathode performance, in accordance with various embodiments of the present invention.

In another embodiment, treatment of a cathode during an in situ maintenance cycle can comprise the electrochemical activation of one or more cathodes. To this end, cathodes can be activated by the application of a negative bias and/or high current flow. A high cathodic bias can help establish a surface chemistry typically stable only under harsher reducing conditions. Various activation processes are possible depending on the cathode material and the kinetics of the possible oxygen incorporation mechanisms. Virtually all activation processes have in common that either the oxygen incorporation kinetics of the prevalent mechanism or of a secondary slow mechanism are accelerated. As an example for LSM-based cathodes, oxygen is incorporated under normal operating conditions almost exclusively at the triple phase boundaries between LSM, zirconia electrolyte and the gas phase. Under strong cathodic polarization, the electrolyte surface can become enriched in $Mn^{2+}$ and oxygen vacancies, and thus exhibit a significantly improved electrical conductivity. As a result, direct oxygen incorporation from the gas phase into the electrolyte can become facile and the overall oxygen incorporation rate can be significantly accelerated under strong cathodic bias. Once the bias is removed, the surface chemistry of the cathode can be preserved and can remain over a period of time such as, for example, several hours. An example of electrochemical cathode activation and the related decrease in cathode resistance, together with the slow relaxation back to an original performance level after removal of the applied bias, is shown in FIG. 16. Since this electrochemical activation is typically a rapid process and the relaxation after bias removal is slow, a cyclic electrochemical activation of a cathode can be implemented to achieve an overall higher average power output by the cyclic operation.

EXPERIMENTAL

To further illustrate the principles of the present invention, the following examples and experimental data are put forth so as to provide those of ordinary skill in the art with a complete disclosure and description of how the methods and devices claimed herein can be performed and evaluated. They are intended to be purely exemplary of the invention and are not intended to limit the scope of what the inventors regard as their invention. Efforts have been made to ensure accuracy with respect to numbers (e.g., amounts, temperatures, etc.); however, some errors and deviations may have occurred. Unless indicated otherwise, parts are parts by weight, temperature is ° C. or is at ambient temperature, and pressure is at or near atmospheric.

In the following examples, cathode behavior was evaluated under various simulated cyclic SOFC operating conditions that provide performance recovery in accordance with various embodiments of the present invention. The experimental observations were conducted on symmetric cathode/cathode single cells (oxygen pump cells) operated in air. Cathode polarization was simulated by the application of a bias across the cell. The single cells were comprised of 3YSZ electrodes with screen printed $(La,Sr)MnO_3/YSZ$ cathode catalyst and $(Ag,Pd)/3YSZ$ current collector layers deposited on both sides. A double set of leads was the attached to the current collectors for use as biasing and sensing electrode contacts.

The baseline performance of the cells was first acquired at 750° C. in air. Electrochemical testing of the samples was then conducted in a closed alumina tube over a chromia powder bed. A slow flow of either dry air or humidified air (bubbling of dry air through water at room temperature) was conducted through the furnace. For electrochemical testing, a Solartron impedance analyzer was used. To that end, the impedance spectra were acquired in the frequency range form 0.1 to 300000 Hz; i-V-curves were acquired in the range form −0.5 to +0.5V and i(t) curves were acquired at cathodic bias of −0.1, 0.2, 0.3 and 0.4V. Electrochemical analysis of at least a portion of the samples described herein was conducted under a variety of current activation conditions. Activation and relaxation of cell components were followed as a function of time.

Example 1

Recovery of Chromium Poisoned Cathode

Figure 10:
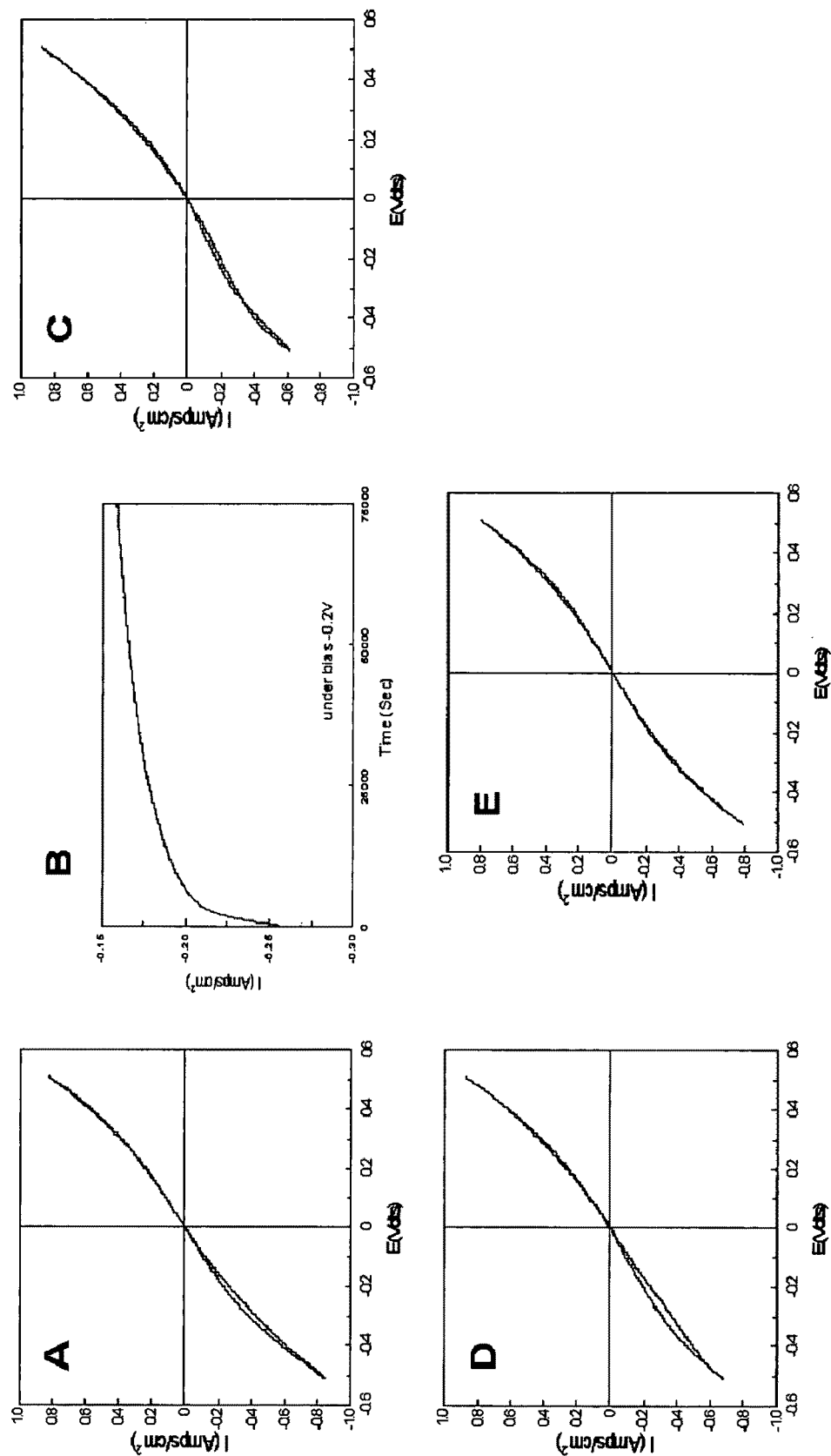
FIG. 10 illustrates a loss of cathode performance by chromium poisoning during initial cathode operation in a Cr-oxide vapor under cathodic polarization and the subsequent performance recovery, in accordance with various embodiments of the present invention.

Loss of cathode performance by Cr-poisoning during initial cathode operation in Cr-oxide vapor under cathodic polarization and performance recovery were demonstrated by the example of a symmetric cathode/cathode single cell pump sample with $(La_{0.8}Sr_{0.2})_{0.97}MnO_3/3YSZ$ composite cathodes and Ag/3YSZ-based current. Cathode impedance and cathode current density were evaluated as a function of applied potential in the presence of a $Cr_2O_3$ powder bed under dry or humid air flow at 750° C. The cathode performance degradation was found to remain relatively small over the chromia powder bed after an initial stabilization period as long as no bias (simulated polarization) was applied. The initial cell performance in air is shown in FIG. 10A by the i-V characteristics before any polarization in $Cr_2O_3$.

The operating cathode pump cells were then exposed to bias (simulating cathode polarization in operating devices/stacks) which leads to the known poisoning of the cathodes by chromia. Application of cathodic polarization yields an immediate drop in performance. The evolution of current density with time i-t under bias −0.2V in presence of Cr-oxide vapor is shown in FIG. 10B. The degraded performance after 30 h of polarization at bias −0.2V is shown in i-V curve in FIG. 10C. Recovery at 0V after 2 h and 20 h is shown in FIGS. 10D and 10E, respectively.

Figure 11:
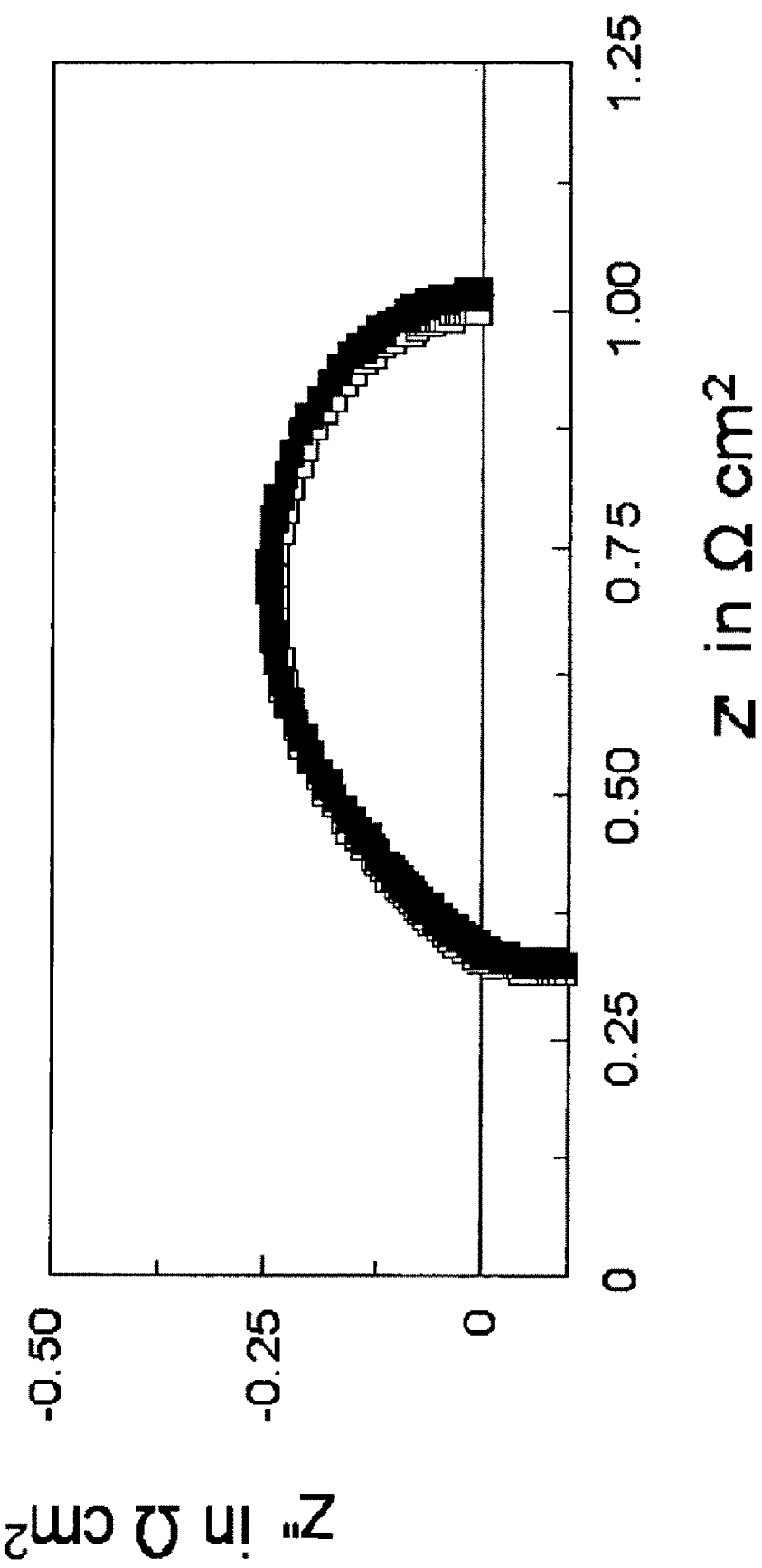
FIG. 11 illustrates recovery of cathode performance, after chromium poisoning, in a symmetrical cathode/cathode single cell pump sample, in accordance with various embodiments of the present invention.

FIG. 11 illustrates the associated cathode impedance before polarization and after recovery, showing that even though the cathode lost significant performance, it recovered to substantially the full initial performance level after the applied recovery cycle.

Figure 12:
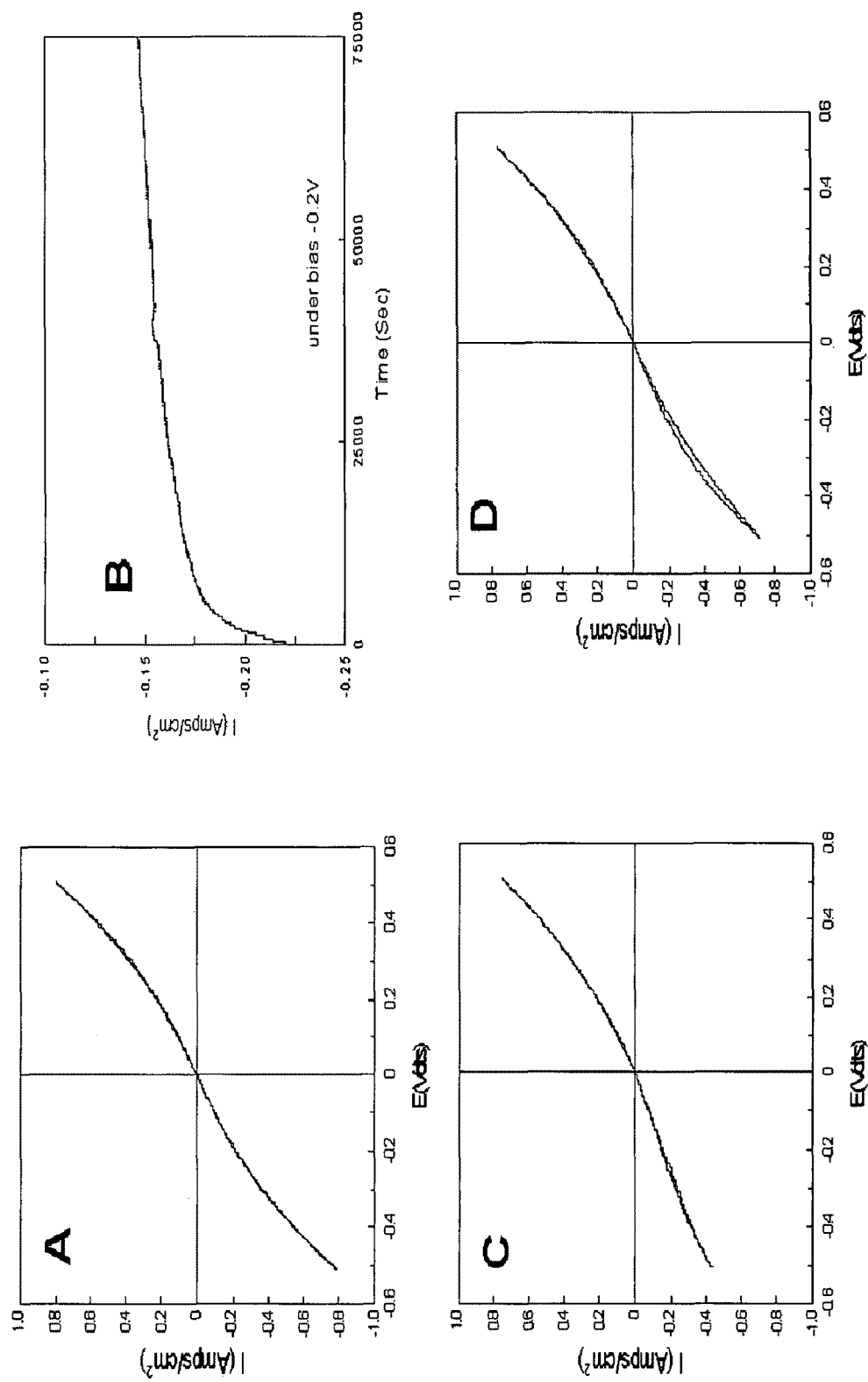
FIG. 12 illustrates a loss of cathode performance by chromium poisoning in humid air resulting from exposure to chromium oxide vapor under cathodic polarization subsequent performance recovery, in accordance with various embodiments of the present invention.

The loss of cathode performance by Cr-poisoning during several hundred hours of operation in humid air in Cr-oxyhydroxide vapor under cathodic polarization and the possible performance recovery are demonstrated in FIG. 12 by the example of a symmetric cathode/cathode single cell pump sample with $(La_{0.8}Sr_{0.2})_{0.97}MnO_3/3YSZ$ composite cathodes and Ag/3YSZ-based current collector. The initial cell performance in humid air is shown by the i-V characteristics before any polarization in $pCr_2O(OH)_2$ in FIG. 12A. Application of cathodic polarization yields an immediate drop in performance, the evolution of current density with time i-t under bias −0.2V in presence of Cr-oxide vapor is shown in FIG. 12B. The degraded performance after 20 h of polarization at bias −0.2V is shown in i-V curve of FIG. 12C. Recovery at 0V after 4 h is shown in FIG. 12D.

Figure 13:
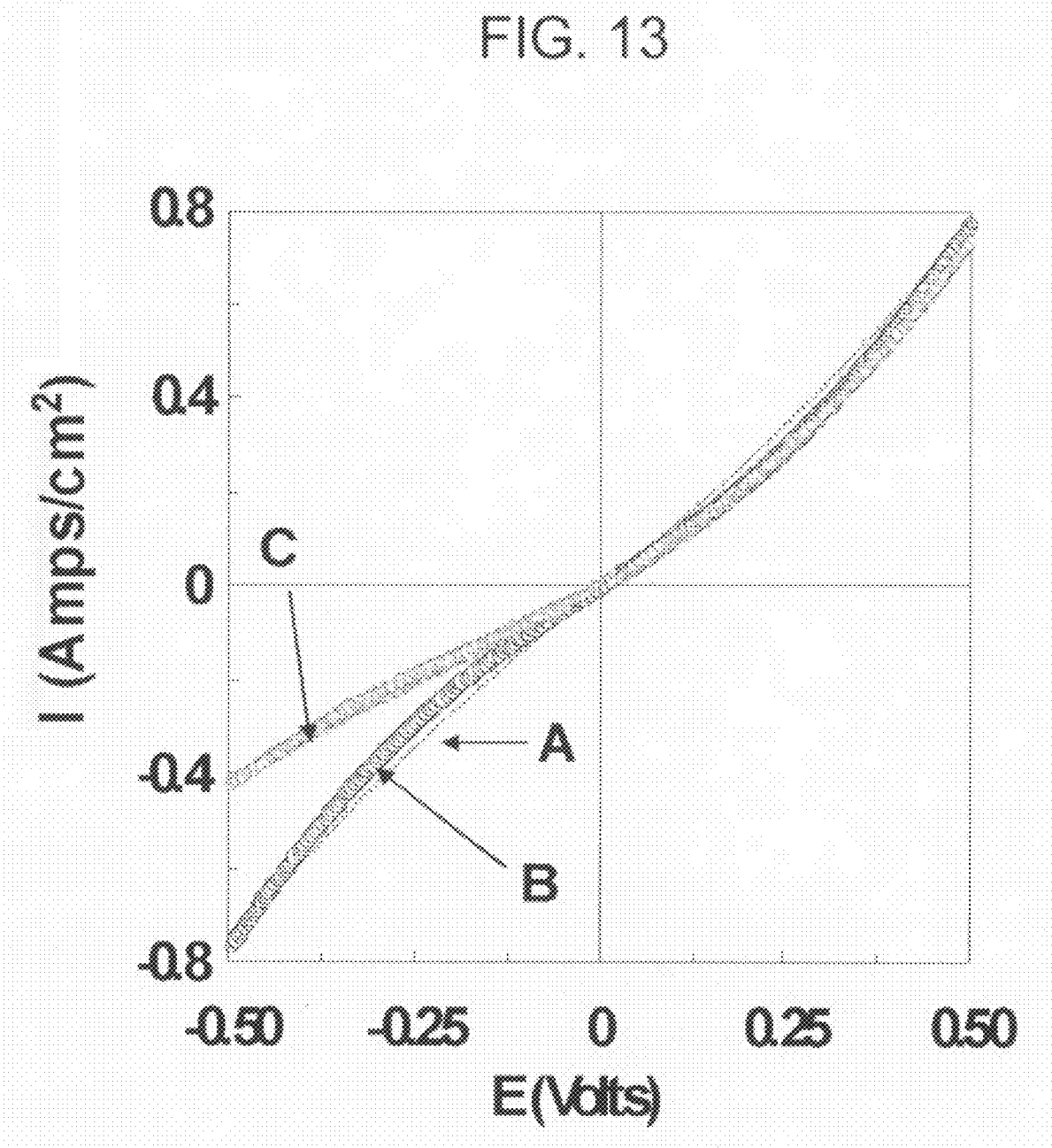
FIG. 13 illustrates a loss of cathode performance by chromium poisoning in chromium oxyhydroxide vapor under cathodic polarization in a cathode/cathode single cell pump sample, in accordance with various embodiments of the present invention.

FIG. 13 illustrates for the configuration of the cathode pump samples described above the sequence of i-V curve for the initial performance before bias application (A), after exposure to $Cr_2O_3$ without any applied bias (B) and after exposure to $Cr_2O_3$ under an applied bias of −0.2V (C).

Figure 14:
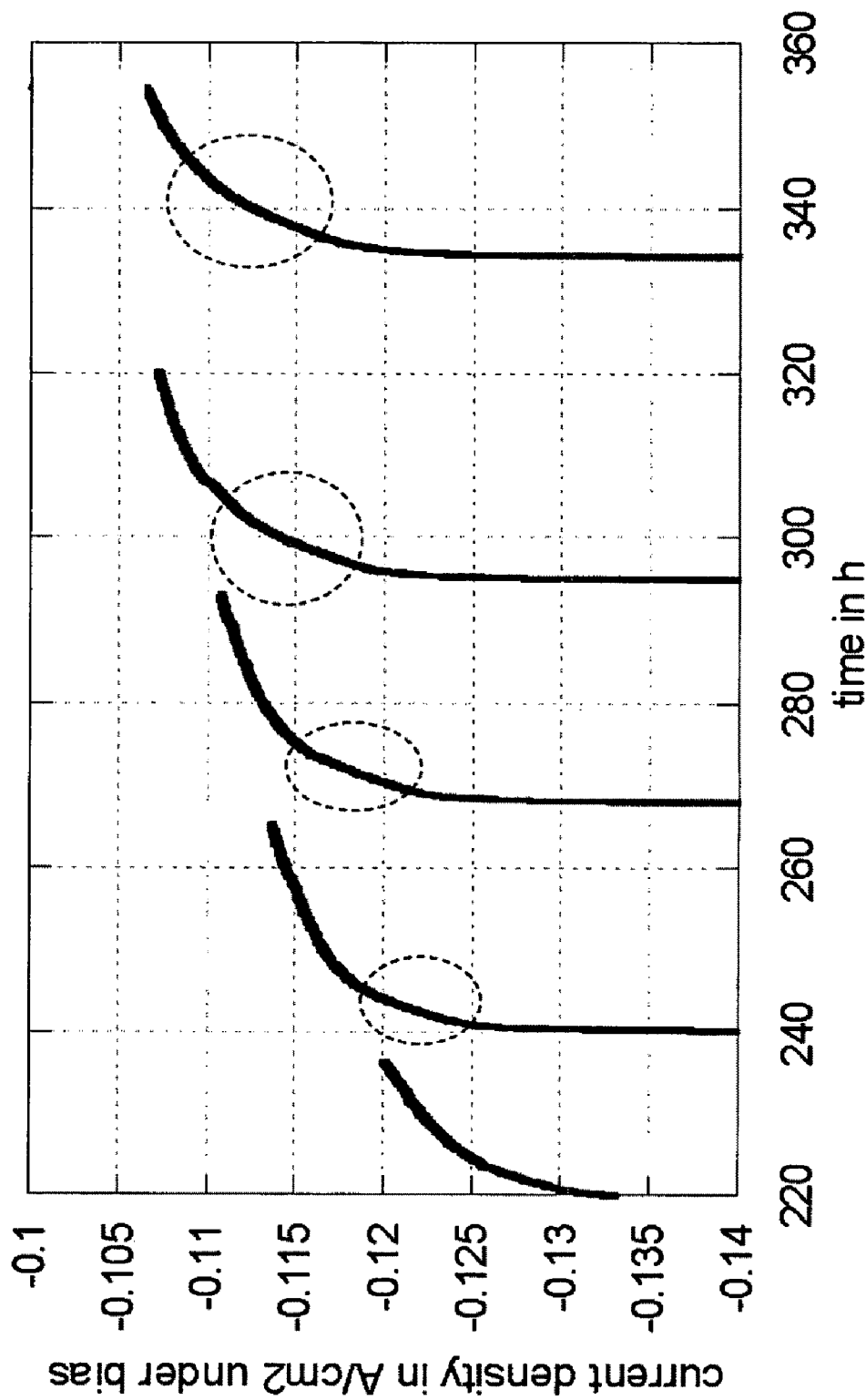
FIG. 14 illustrates recovery of the reversible portion of chromium poisoning of a cell through cyclic operation of load and recovery cycles, in accordance with various embodiments of the present invention.

Cell recovery through cyclic operation of load and recovery cycles from the reversible portion of Cr-poisoning is demonstrated in FIG. 14 for the above described cells with $(La_{0.8}Sr_{0.2})_{0.97}MnO_3/3YSZ$ composite cathodes. The symmetric cathode/cathode single cell was submitted to cyclic operation as an oxygen pump cell in a $CrO_3$ vapor-containing environment. During polarization, the cathodically polarized cathode degrades in performance by Cr-poisoning. When the polarization is turned of, the cathode recovers very rapidly almost its initial performance. FIG. 14 presents several exemplary polarization cycles under a −0.2V bias at 750° C. and short recovery cycles at bias 0V. The performance of the cathode pump sample with the polarized cathode is illustrated as current density as function of time. Interruption of polarization leads to immediate recovery of a large portion of the cathode performance; after returning to the same bias (same polarization), the cathode slowly loses only its regained performance and returns to the baseline. The gain in performance in the first hours is significant. A slight gain can still be noticed after 24 h. For better visualization, the performance gain is encircled.

Figure 15:
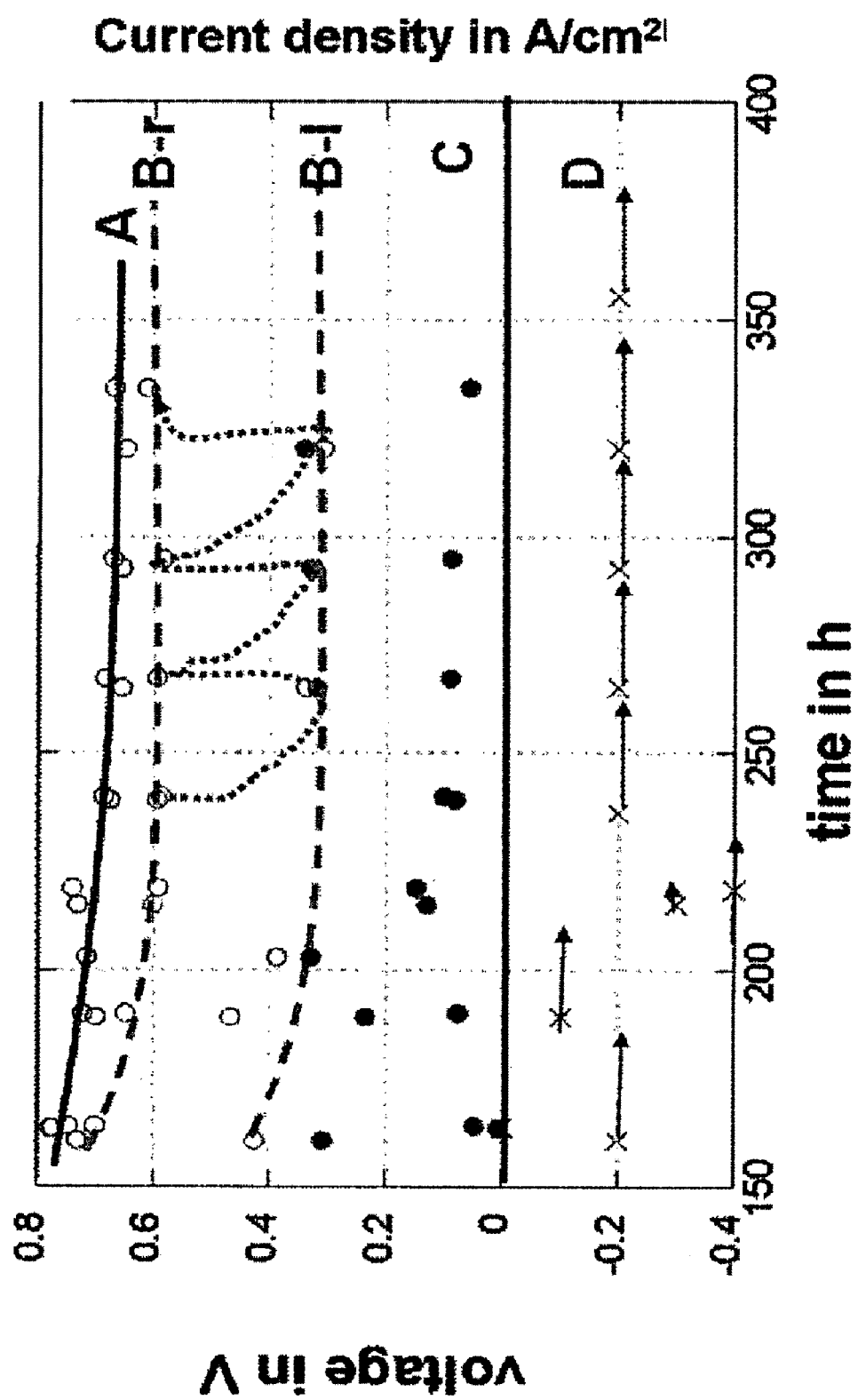
FIG. 15 illustrates the performance loss under cathode polarization and subsequent recovery of cathode performance from application of a 0 V bias, in accordance with various embodiments of the present invention.

FIG. 15 provides a further illustration of performance loss in the presence of Cr-sources under cathode polarization (simulated by application of bias to symmetric cathode pump cell) and recovery of cathode performance at bias 0V. The top line with data points (A) shows the performance evolution of the reference cathode. The lines (B-r) and (B-I) with open dots show the performance evolution of the cathodically polarized cathode in a symmetric cathode cell pump configuration. The performance of the cathodically polarized cathode evolves within the boundaries indicated by the two dotted boundaries (B-r) and (B-I). The cathode reaches a performance level approaching that of the reference cathode in the recovery cycle under released bias (B-r). Under applied bias of −0.2V, its performance drops to the low current density boundary line (B-I). Current densities are reported for the cathode pump sample at 0.5V while operating in air at 750° C. in $CrO_3$ vapor (formed by a $Cr_2O_3$ powder bed at 750° C.). The difference in current density at 0.5V for the recovered cell and for the cathodically polarized (−0.2V) cell are shown by the solid black dots (C) in FIG. 15. The polarizing bias for the cell is shown in the bottom portion (D) of FIG. 15. The cathode pump cell is exposed to multiple cycles of polarization and recovery. The recovery behavior is drawn for some cycles by hand as dotted line interconnecting lines (B-r) and (B-I).

Example 2

Electrochemical Activation of the Cathode

FIG. 16 illustrates the performance gain that can be achieved when a cathode is cathodically polarized. For example, a simple experimental was constructed using a symmetric cathode pump cell of example 1, in which strong cathodic polarization and high current densities are achieved by application of a cathodic bias. Due to the cathodic polarization and/or high current density, the cathode is activated and exhibits a long-term improvement in performance. FIG. 16 presents exemplary results for a cathode pump sample with electrodes made of a thin LSM cathode layer with a Ag-based current collector. The cathode has a very low triple phase boundary density. It was submitted to an exemplary electrochemical activation cycle at −0.4V. The evolution of the cathode resistance during the electrochemical activation is illustrated in FIG. 16. The filled circles indicate the total cathode resistance. The filled squares indicate the charge transfer resistance. The open triangles indicate the adsorption and dissociation resistance and the open diamonds indicate the dissociation or adsorption resistance. After release of the activating bias of −0.4V, relaxation of the performance occurs slowly. FIG. 16 shows that the cathode resistance increases slowly with time. It can be seen that in an initial time after the release of the activating bias, a performance gain is achieved over some time. For a higher applied bias, the relaxation time is longer. The electrochemical activation can be periodically repeated.

Example 3

Activation of the Anode by Redox-Cycling

Figure 17:
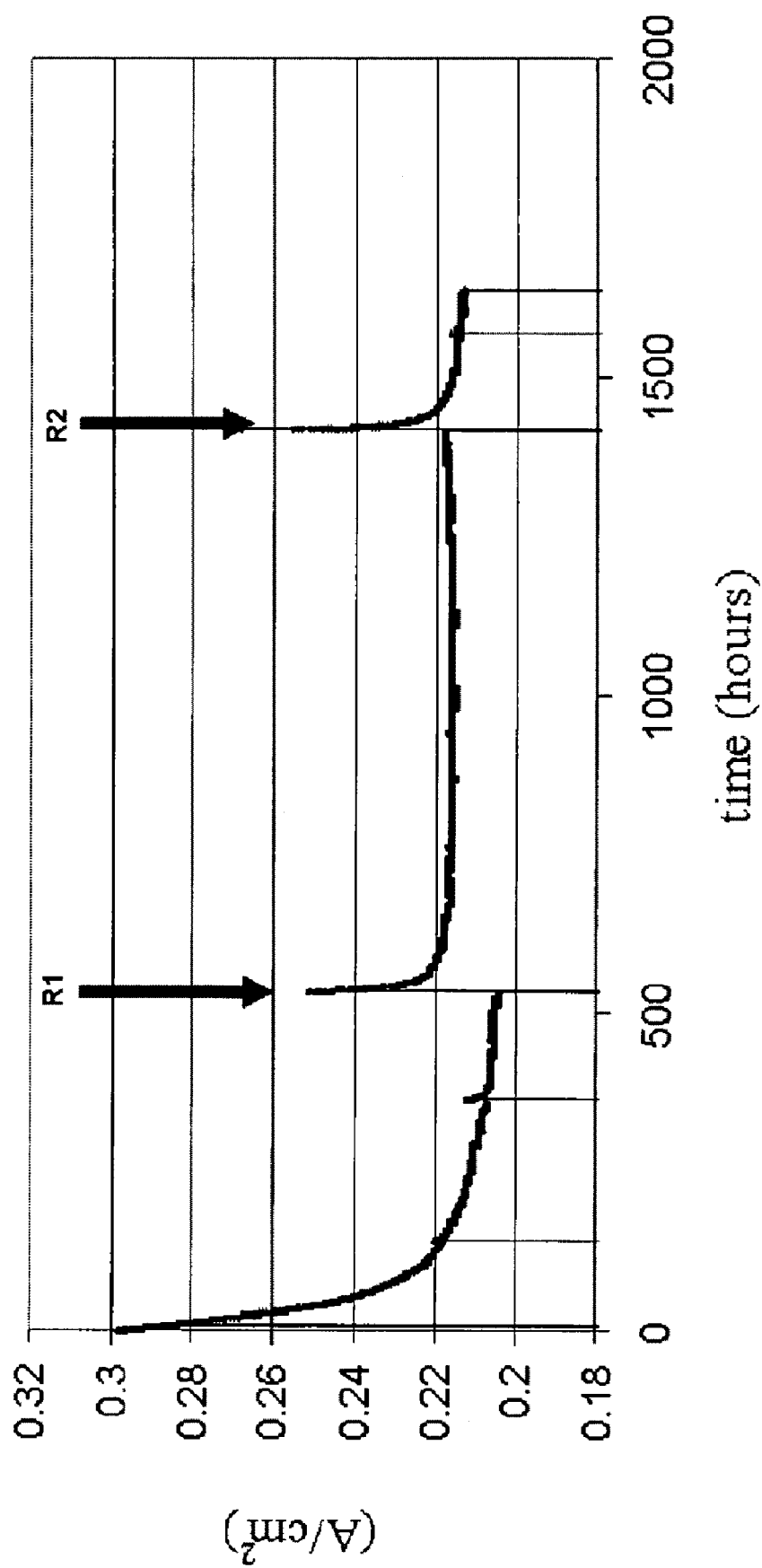
FIG. 17 illustrates performance recovery of a device by redox-cycling the anode in accordance with various embodiments of the present invention.

During operation, Ni-based anodes can suffer a slow degradation of performance due to alloying with current collector metals, impurities, or by poisoning species in the gas stream. The initially active metallic nickel transforms into a less active, alloyed nickel. This is demonstrated with the example of a single cell with LSM/YSZ cathode and Ni-YSZ anode operating at 720° C. in 33% $H_2$/67% $N_2$ and air, wherein periodic oxidation/reduction cycles can be used to improve the overall performance of the anode. FIG. 17 illustrates an example where the anode is repeatedly submitted to air, oxidized and then afterwards again reduced and operated. Each redox-cycle (indicated by R1 and R2) introduces a significant increase in performance with a slow decay over several hours, ultimately reaching the performance an equivalent sample would show had it not undergone the oxidation. The current densities in FIG. 17 are measured in 33% hydrogen and 67% nitrogen air at 0.7V and at temperature of 725° C.

Lastly, it should also be understood that while the present invention has been described in detail with respect to certain illustrative and specific embodiments thereof, it should not be considered limited to such, as numerous modifications are possible without departing from the broad scope of the present invention as defined in the appended claims.

The invention claimed is:

1. A method of operating a solid oxide fuel cell device comprising a plurality of "n" independently controllable power producing segments, the method comprising:

a) operating at least one of the "n" independently controllable power producing segments in a power producing mode; and
b) simultaneously subjecting at least one of the "n" independently controllable power producing segments not operating in a power producing mode to an in situ maintenance process for a period of time,
wherein the maintenance process comprises at least one of:
   i) applying an electrical potential between the at least one anode and the at least one cathode,
   ii) subjecting the at least one anode to one or more potential cycles,
   iii) exposing the at least one anode to air and/or an oxygen containing atmosphere,
   iv) adjusting the magnitude of an electrical load electrically connected to the at least one anode and the at least one cathode,
   v) removing any electrical load connected to the at least one anode and/or the at least one cathode such that the segment is at open-circuit voltage,
   vi) passing an electrical current between the at least one anode and the at least one cathode, and
   vii) exposing at least one cathode to a low oxygen content atmosphere.

2. The method of claim 1, further comprising, after the period of time,
   c) selecting at least one of the "n" independently controllable segments subjected to an in situ maintenance process,
   d) operating the at least one of the selected "n" independently controllable segments of c) in a power producing mode, and
   e) simultaneously subjecting at least one of the "n" independently controllable segments previously operated in a power producing mode of step a) to an in situ maintenance process for a second period of time.

3. The method of claim 2, wherein steps c) through e) are repeated until each of the "n" independently controllable segments has been subjected to at least one in situ maintenance process.

4. The method of claim 1, wherein, prior to steps a) and b), the at least one independently controllable power segments to be subjected to the in situ maintenance process is determined by monitoring one or more predetermined performance property of each of the plurality of "n" independently controllable power segments.

5. The method of claim 1, wherein the maintenance process comprises at least one of a regeneration process, an activation process, or a combination thereof.

6. The method of claim 1, wherein prior to step b), the at least one independently controllable power segment to be subjected to the in situ maintenance process of step b) has a first maximum power capacity, wherein after the period of time, the independently controllable power segment of step b) has a second maximum power capacity, and wherein the second maximum power capacity is greater than the first maximum power capacity.

7. The method of claim 1, wherein an electrical current is passed and/or an electrical potential is applied between the at least one anode and the at least one cathode sufficient to remove and/or render inert at least a portion of an impurity present on a surface of the at least one anode.

8. The method of claim 7, wherein the impurity comprises at least one of coke, a sulfur containing compound, a chromium containing compound, or a combination thereof.

9. The method of claim 1, wherein each independently controllable segment comprises at least one anode and at least one cathode, and wherein the maintenance process comprises passing a current between the at least one anode and the at least one cathode for a predetermined period of time.

10. The method of claim 1, wherein each independently controllable segment comprises at least one anode and at least one cathode, and wherein the maintenance process comprises:
   c) removing any electrical load connected to the at least one anode and/or the at least one cathode such that the segment is at open-circuit voltage, and
   d) introducing a cleaning gas into the at least a portion of the at least one "n" independently controllable segments not operating in a power producing mode.

* * * * *